United States Patent [19]
Greene et al.

[11] Patent Number: 5,361,891
[45] Date of Patent: Nov. 8, 1994

[54] TAPE CONVEYOR SYSTEM

[75] Inventors: Harold R. Greene, Farmers Branch; Michael J. Foreman, Carrollton, both of Tex.

[73] Assignee: Comco Systems, Dallas, Tex.

[21] Appl. No.: 78,606

[22] Filed: Jun. 16, 1993

[51] Int. Cl.$^5$ .............................................. B65G 25/00
[52] U.S. Cl. .................................... 198/797; 198/834; 186/41; 186/37
[58] Field of Search ...................... 198/750, 468.6, 834, 198/797; 186/41, 53, 37; 474/134, 149

[56] References Cited

U.S. PATENT DOCUMENTS

| | | | |
|---|---|---|---|
| 859,595 | 7/1907 | Camp | 198/371 |
| 1,086,522 | 2/1914 | Gilman | 198/371 |
| 3,587,524 | 6/1971 | Feating | 198/803.15 |
| 4,010,824 | 3/1977 | Bavis | 186/1 C |
| 4,411,336 | 10/1983 | Anders | 186/37 |
| 4,546,857 | 10/1985 | Hamada et al. | 186/37 |
| 4,564,098 | 1/1986 | Homann | 474/134 X |
| 4,624,359 | 11/1986 | Gross | 198/366 |
| 4,645,035 | 2/1987 | Bavis | 186/37 |
| 4,712,650 | 12/1987 | Campbell | 198/797 X |
| 4,758,208 | 7/1988 | Bartos et al. | 474/134 X |
| 4,957,188 | 9/1990 | Bavis | 186/41 |
| 5,054,605 | 10/1991 | Bavis | 198/750 |
| 5,113,970 | 5/1992 | Bavis | 186/41 |

FOREIGN PATENT DOCUMENTS 338289 11/1930 United Kingdom ................ 474/134

OTHER PUBLICATIONS

"Dymetrol ® Mechanical Drive Tapes Design Guide", Du Pont Brochure E-68159-1, pp. 1–5, published Dec. 1987.

Primary Examiner—Cheryl L. Gastineau
Attorney, Agent, or Firm—Richards, Medlock & Andrews

[57] ABSTRACT

A tape conveyor system for moving a carriage along a path having at least one vertical curve and at least one horizontal curve comprises a carriage track, a tape guide, and a carriage. A block on the tape is movably positioned between two elements on the carriage to effect movement of the carriage along the carriage track. The tape guide orients the tape width horizontally during each vertical curve and vertically during each horizontal curve. The carriage track has two opposing channels, and the carriage has wheels in each channel so that the carriage can move along both horizontal and vertical track portions in a stable manner. A container can be mounted to the carriage via a leveling mechanism which cooperates with cam guide surfaces on the carriage track to control the orientation of the container. Two cam followers are mounted on opposite ends of a leveler arm such that one of the cam followers can be actuated by contact with a cam guide surface to effect the rotation of the transport container with respect to the carriage as the carriage negotiates a vertical curve. A tape drive comprises two smooth rolls and a toothed cog wheel positioned between the rolls such that the tape passes around one roll, then the cog wheel and then the other roll, with the passage from the cog wheel to the second roll being substantially immediately to provide a reverse curvature of the tape.

53 Claims, 14 Drawing Sheets

TAPE CONVEYOR SYSTEM

FIELD OF THE INVENTION

This invention relates a conveyor system which utilizes a drive tape. In one aspect the invention relates to a drive mechanism for operating the conveyor system. In another aspect the invention relates to a carriage for use with a drive tape to maintain a desired orientation of a container during transport. In a further aspect the invention relates to a tape conveyor system which can transit curves in various planes. In another aspect the invention relates to a tape drive system having a cog wheel at an intermediate location in engagement with two spaced apart portions of the tape.

BACKGROUND OF THE INVENTION

Pneumatic conveyor systems are extensively utilized in drive-in banking facilities to transport money, checks and other documents in a tubular container which moves through a pneumatic tube extending between a customer's station at a location spaced from the bank building and a cashier's station within the bank building. The pneumatic tube can provide a path which includes numerous legs extending in various directions, both horizontal and vertical. This is particularly advantageous in providing great flexibility in locating either the customer's station or the cashier's station. The pneumatic conveyor systems have generally been satisfactory where the material being transported comprises only checks, deposit slips, paper currency, or other light weight paper documents. However, the transport of heavy articles, e.g., rolls of coins, in such pneumatic conveyor systems can present a problem in that, unless restraining material is included in the tubular container, the articles can move about within the tubular container and thus are free to crash against the forward end of the tubular container when the tubular container changes from a horizontal portion of the conveyor run to a vertical portion of the conveyor run. Such impacts can damage the tubular containers as well as interfere with the smooth movement of the tubular container through the pneumatic conveyor.

While mechanical conveyors, driven by chains, cables or drive tapes, can generally handle heavier loads than the pneumatic conveyor systems, in general they are still subject to the problems of load shifting, particularly upon the transition from a horizontal leg to a vertical leg of the conveyor run. Bavis, U.S. Pat. No. 4,957,188, describes one effort to provide a stabilized carrier for use in conveying food and beverage containers between a processing station in a drive-in restaurant and a customer at a delivery station located remotely from the restaurant. The conveyor has a pair of drive tapes which are horizontally spaced apart from each other and which are driven in unison by a common drive. The carrier basket is suspended from the pair of conveyor drive tapes by mounting blocks and is free to rotate relative to the horizontal axis through the mounting blocks. A stabilizing cam is provided on the carrier basket in engagement with a cam track so as to prevent rocking of the carrier basket. Thus, the carrier basket will remain vertically disposed as the drive tapes translate between the horizontal and vertical flights of the conveyor, provided that all of the flights of the conveyor are located in a single vertical plane. The drive tapes are flexible and can bend to negotiate curves by being guided in a channel or other guiding device. Thus, with the carrier basket being suspended from the horizontally spaced apart pair of drive tapes, the conveyor can readily negotiate the transitions from the vertical to the horizontal and from the horizontal to the vertical. However, the conveyor system is not adapted to provide a transition from one horizontal direction to another horizontal direction, thereby limiting the usefulness of the conveyor system to a planar path.

Bavis, U.S. Pat. No. 5,054,605, discloses a conveyor system utilizing either a single drive tape or a pair of drive tapes, with each tape being connected to a rigid carrier by two connectors spaced apart along the longitudinal length of the carrier, with at least one of the connectors comprising a pin in a slot in order to permit a limited movement of the adjacent portion of the tape with respect to the rigid carrier. This permits accommodation of the increase in longitudinal length of tape between the two attachment points when the carrier passes through a planar transition curve between a horizontal leg and a vertical leg due to the curvature of the tape.

Although U.S. Pat. No. 5,054,605 acknowledges that several prior conveyor systems were designed for conveying items which must remain vertically oriented throughout the conveying movements, such as liquid containers, food items, and the like, the apparatus disclosed in U.S. Pat. No. 5,054,605 is not capable of accomplishing that objective in any conveyor system which provides movement in any direction other than a single horizontal straight line or a single vertical straight line. Whether a pair of drive tapes or a single drive tape is employed, the carriage is positioned vertically with its first end up at the customer station and vertically with its first end down at the teller station, while being in a horizontal position for a portion of the distance between the two stations. Thus, any object placed in the carriage in a right-side-up position in one station would be upsidedown in the other station. Moreover, even though the patent acknowledges that the flexible drive tape is capable of assuming an almost unlimited variety of curves, bends and substantially straight sections, the only disclosed conveyor paths are planar paths and the disclosed apparatus is not suited for conveyor paths having transition curves in different planes.

SUMMARY OF THE INVENTION

In one aspect the invention provides a tape conveyor system for moving a carriage along a path having at least one vertical-to-horizontal transition curve as well as at least one horizontal-to-horizontal transition curve. The system comprises a carriage track, a tape guide for orienting the width of the drive tape and guiding the drive tape during movement of the drive tape along the longitudinal axis of the drive tape, and a carriage movably positioned in the carriage track for movement along the length of the carriage track. The carriage has at least one carriage drive element which is engaged by the drive tape during movement of the drive tape along the tape guide. The tape guide orients the width of the drive tape in an at least generally horizontal direction during each vertical-to-horizontal transition curve and orients the width of the drive tape in an at least generally vertical direction during each horizontal-to-horizontal transition curve.

In another aspect the invention provides a tape conveyor system for moving a carriage along a path in response to the movement of a drive tape, wherein the system comprises a carriage track having first and second carriage channels, a tape guide for orienting the width of the drive tape and guiding the drive tape during movement of the drive tape along the longitudinal axis of the drive tape, a carriage positioned in said carriage track, and at least one drive element on the carriage which is engaged by the drive tape during movement of the drive tape along said tape guide. The carriage is provided with wheels positioned in the first and second carriage channels to enable the carriage to readily move along both horizontal and vertical portions of the carriage track. A transport container can be mounted to the carriage via a leveling mechanism which cooperates with cam guide surfaces on the carriage track to control the orientation of the transport container during the movement of the carriage along the carriage track. In a preferred embodiment, the leveling mechanism includes a leveler arm having a cam follower mounted on each end of the leveler arm. At least one of the cam followers can be actuated by contact with a cam guide surface to effect the rotation of the transport container with respect to the carriage.

In a further aspect the invention provides a drive mechanism for a drive tape having a plurality of apertures spaced apart along the longitudinal axis of the tape, The drive mechanism comprises first and second idler rolls and a cog wheel, with the cog wheel being positioned adjacent to and between the first and second idler rolls such that the drive tape passes in contact with the periphery of one of the first and second idler rolls, then at least substantially immediately passes in contact with the periphery of the cog wheel, and then at least substantially immediately passes in contact with the periphery of the other of the first and second idler rolls. The cog wheel is provided with a plurality of teeth spaced about its periphery so that teeth of the cog wheel enter apertures of the tape as the tape passes in contact with the cog wheel. The periphery of each of the idler rolls is smooth so that the only mechanical engagement between the drive mechanism and the tape is by the teeth on the cog wheel. In a preferred embodiment, each of the idler rolls has a diameter which is between about 50 and about 100 percent of the diameter of the cog wheel, and the cog wheel and the first and second idler rolls are positioned so that the tape is tangent to the first idler wheel and to the cog wheel at a first common point, and is also tangent to the second idler wheel and to the cog wheel at a second common point.

DETAILED DESCRIPTION

Figure 1:
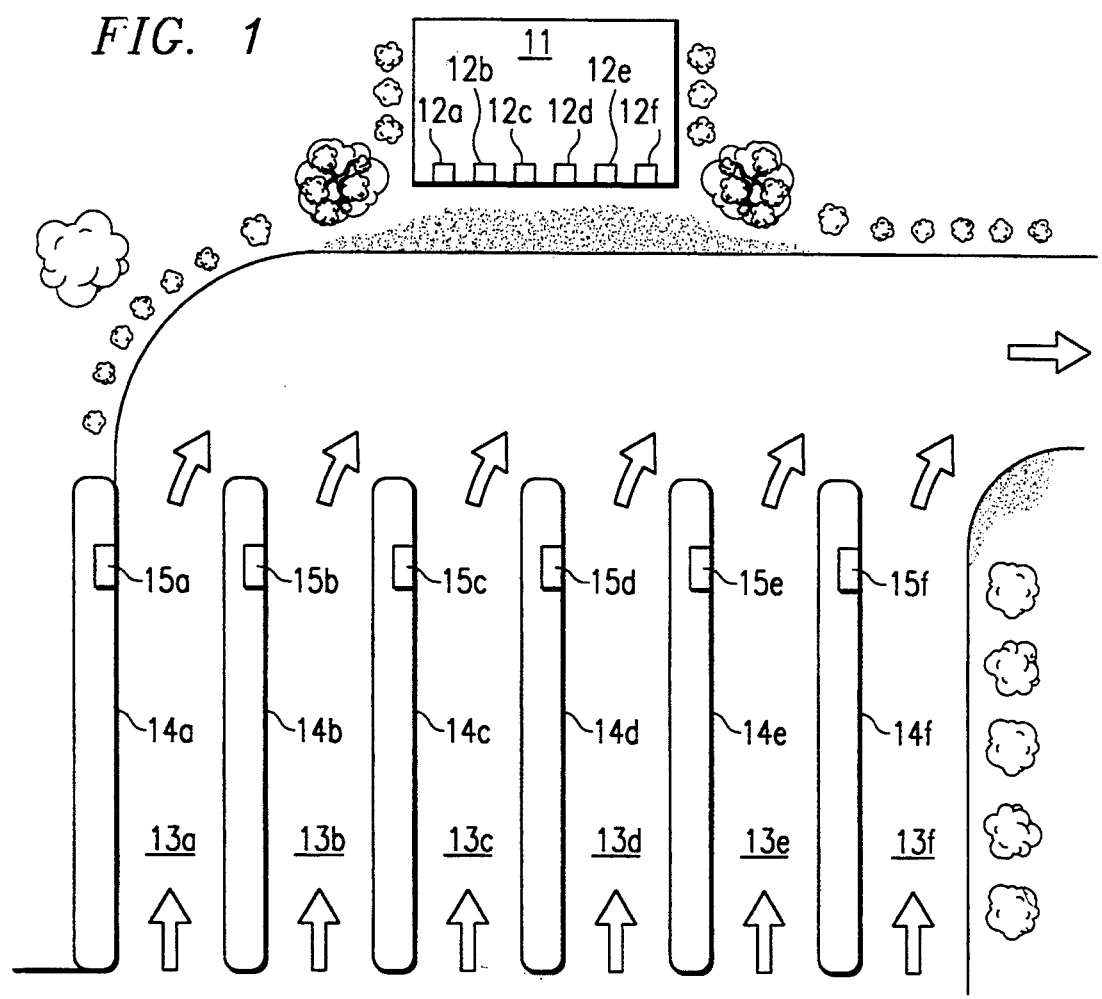
FIG. 1 is a plan view of a drive-in facility having a plurality of operator stations located in a building and a corresponding plurality of customer locations located remotely from the building, wherein the drive-in lanes are generally perpendicular to the building.

Referring now to FIG. 1, a drive-in facility has a building 11 containing six operator stations 12a–12f located along one side of the building facing six drive-in lanes 13a–13f which are defined by raised islands 14a–14f and which are generally perpendicular to the side of the building 11 containing the operator stations 12a–12f. Each island 14a–14f is provided with a customer station 15a–15f. Thus, while each of the customer stations 15a–15f can be viewed by the operator at the corresponding operator station 12a–12f, the customer stations 15a–15f are located remotely from the operator stations 12a–12f, as is common in a drive-in facility such as a bank or a fast food restaurant. Thus, it is desirable that a conveyor system be provided between each customer station 15a–15f and its corresponding operator station 12a–12f. Such conveyor systems can be located above ground so as to span the distance between the customer station and the operator station at a level which permits vehicles to pass beneath the overhead portions of the conveyor systems, or intermediate segments of the conveyor system can be located underground. In each embodiment, each conveyor system will comprise a generally vertical segment at the customer station, a generally vertical segment at the operator station, and a generally horizontal segment having each end joined by a curved transition segment to a respective one of the vertical segments.

Due to the width of a drive-through lane, the required separation between adjacent customer stations is substantially greater than is required between adjacent operator stations. Thus, it is frequently desirable that the portion of the building required for the operator stations be smaller than the transverse dimension of the drive-through lanes. However, where the drive-through lanes are facing the portion of the building containing the operator stations, as in FIG. 1, this results in most of the customer stations being outside of a vertical plane perpendicular to the building at the centerline of the corresponding operator station. This could be avoided by having the operator stations in an arcuate array with each customer station being located on a radial line extending through the corresponding operator station. Unfortunately, this would greatly increase the amount of space required by the drive-through lanes. Thus, it is desirable that a conveyor system have a path which is not limited to a single vertical plane, i.e., the conveyor system should be able to contain curves which lie in different planes such as horizontal-to-horizontal curves, vertical-to-horizontal curves, curves in planes inclined to the horizontal, etc. While the multi-planar conveyor path can be readily accomplished by pneumatic conveyors utilizing cylindrical containers, previous conveyor systems using drive tapes have had a planar conveyor path.

It is also desirable that at the customer station the conveyor container open to face the side of the vehicle, and that at the operator station the conveyor container open to face the operator. In a situation such as illustrated in FIG. 1, this requires that the conveyor container be able to rotate about its vertical axis as it moves between the customer station and the operator station.

Referring now to FIGS. 2–5, each of a plurality of conveyor systems 16a–16f extends between a respective one of the customer stations 15a–15f and the corresponding operator station 12a–12f. Each conveyor system 16a–16f comprises a first segment 17a–17f which includes the respective customer station 15a–15f and which extends upwardly at least generally vertically from the respective island 14a–14f, a second segment 18a–18f which is joined to the top of the respective first segment 17a–17f and which provides a curved transition from the at least generally vertical to the at least generally horizontal, a third segment 19a–19f which includes the respective operator station 12a–12f and which extends upwardly at least generally vertically from the operators' desk 21, and a fourth segment 22a–22f which is joined to the top of the respective third segment 19a–19f and which provides a curved transition from the at least generally vertical to the at least generally horizontal. Each conveyor system 16a–16f will also contain at least one intermediate horizontal segment connected between the upper ends of the second and fourth segments.

Figure 2:
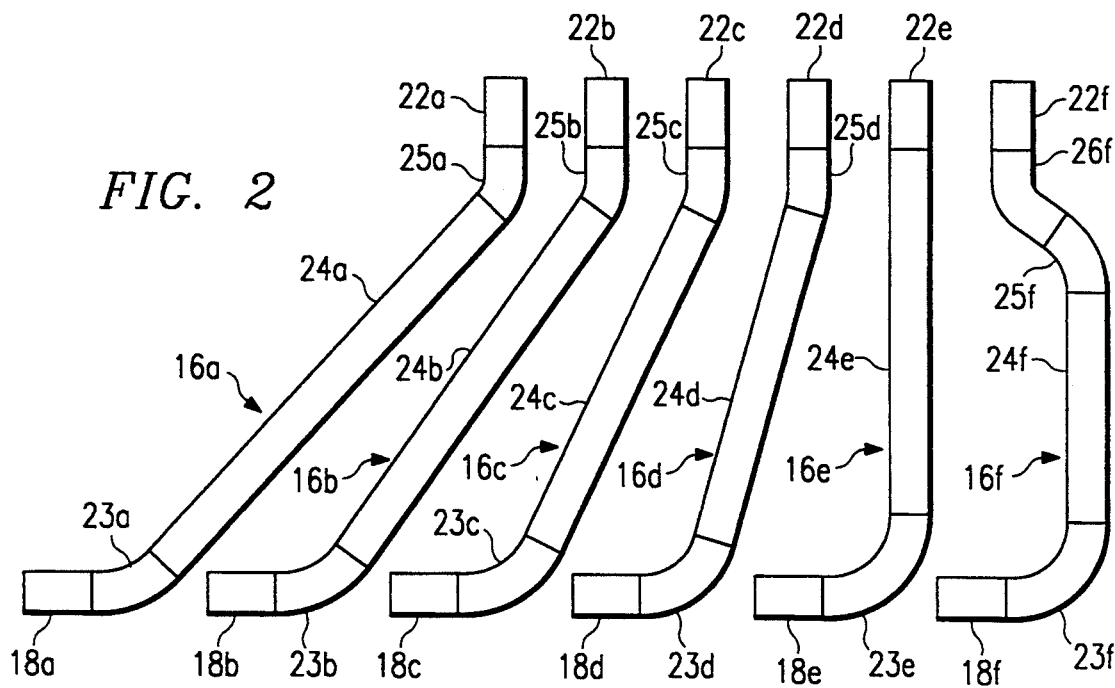
FIG. 2 is a plan view of a plurality of conveyor systems in accordance with the invention, each conveyor system extending between a respective operator station and the corresponding customer station in the drive-in facility of FIG. 1.
Figure 3:
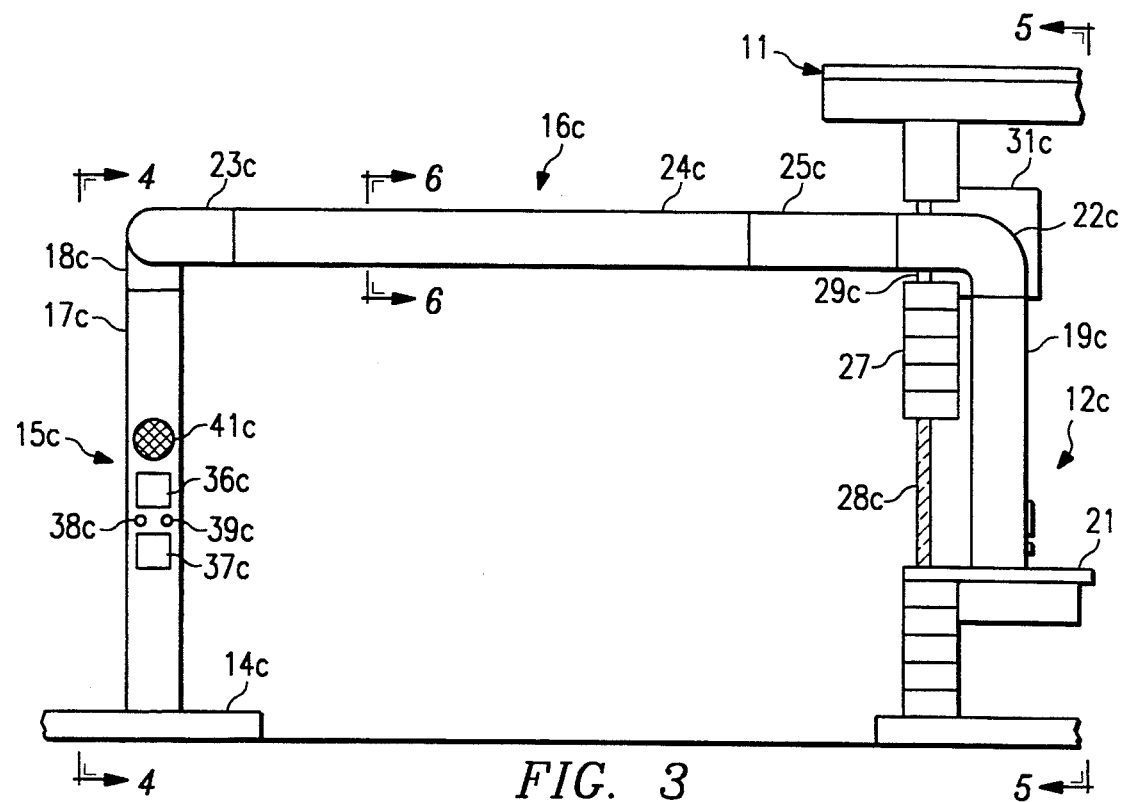
FIG. 3 is an elevational view of one of the conveyor systems of FIG. 2.
Figure 4:
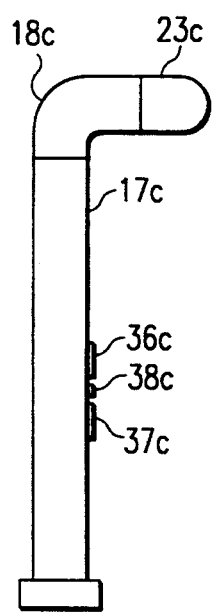
FIG. 4 is an elevational view of the outer end of the customer station of the conveyor system of FIG. 3, taken along line 4—4 in FIG. 3.
Figure 5:
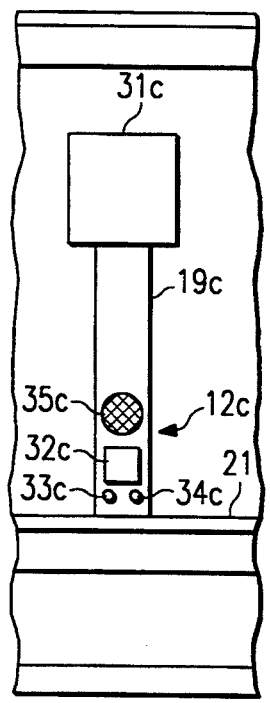
FIG. 5 is an elevational view of the operator station of the conveyor system of FIG. 3, taken along line 5—5 in FIG. 3.

In the facility illustrated in FIGS. 1–3, each of the conveyor systems 16a–16f contains a fifth segment 23a–23f which in connected to the upper end of the respective vertical-to-horizontal transition segment 18a–18f to provide a transition in the horizontal direction, i.e., a horizontal turn to the left, the degree of the turn depending upon the particular conveyor configuration. Each of the conveyor systems 16a–16f also contains a sixth segment 24a–24f, which extends at least generally horizontally and which is at substantially straight. Each of conveyor systems 16a–16d contains a seventh segment 25a–25d which is connected between the second end of straight section 24a–24d and the upper end of the respective vertical-to-horizontal transition segment 22a–22d to provide a transition in the horizontal direction, i.e., a second horizontal turn to the left, the degree of the turn depending upon the particular conveyor configuration. In conveyor system 16e, the second end of the straight section 24e is connected directly to the upper end of the vertical-to-horizontal transition segment 22e, while in conveyor system 16f the second end of straight section 24f and the upper end of the vertical-to-horizontal transition segment 22f are connected by a left turn segment 25f and a right turn segment 26f to provide the desired horizontal offset.

The wall 27 of building 11 facing the drive-through lanes is provided with a window 28a–28f adjacent each operator station 12a–12f so that the operator can view the corresponding customer station 15a–15f, as well as an opening 29a–29f through the wall 27 above the respective operator station 12a–12f for the passage of the conveyor system 16a–16f through the wall 27 and into the building 11. An enclosure 31a–31f can be provided around the horizontal-to-vertical transition segment 22a–22f so as to close the respective opening 29a–29f, thereby providing a weather tight seal for the building 11.

Each of the operator stations 12a–12f is provided with an opening 32a–32f into the conveyor system 16a–16f so that the interior of the transport container is accessible by the operator when the transport container is at the operator station. A control button 33a–33f actuates the conveyor drive to move the transport container in a first direction from the operator station to the customer station, while a control button 34a–34f actuates the conveyor drive to move the transport container in the second or opposite direction from the customer station to the operator station. Each operator station is also provided with an intercom input/receiver 35a-35f. Each of the openings 32a-32f can be provided with a door having an interlock which permits the door to be opened only when the transport container is positioned for access through the opening.

Each of the customer stations 15a-15f is provided with a first or upper opening 36a-36f and a second or lower opening 37a-37f into the conveyor system 16a-16f so that the interior of the transport container is accessible by the customer when the transport container is at one of the two openings at the customer station. The use of both upper and lower openings at the customer station permits easier access by drivers of vehicles of different heights. A control button 38a-38f actuates the conveyor drive to move the transport container in the second direction from the customer station to the operator station. A second control button 39a-39f can be employed to cause the transport container to move to the lower opening 37a-37f. Each customer station is also provided with an intercom input/receiver 41a-41f. Each of the openings 36a-36f and 37a-37f can be provided with a door having an interlock which permits the door to be opened only when the transport container is positioned for access through the respective opening.

Figure 6:
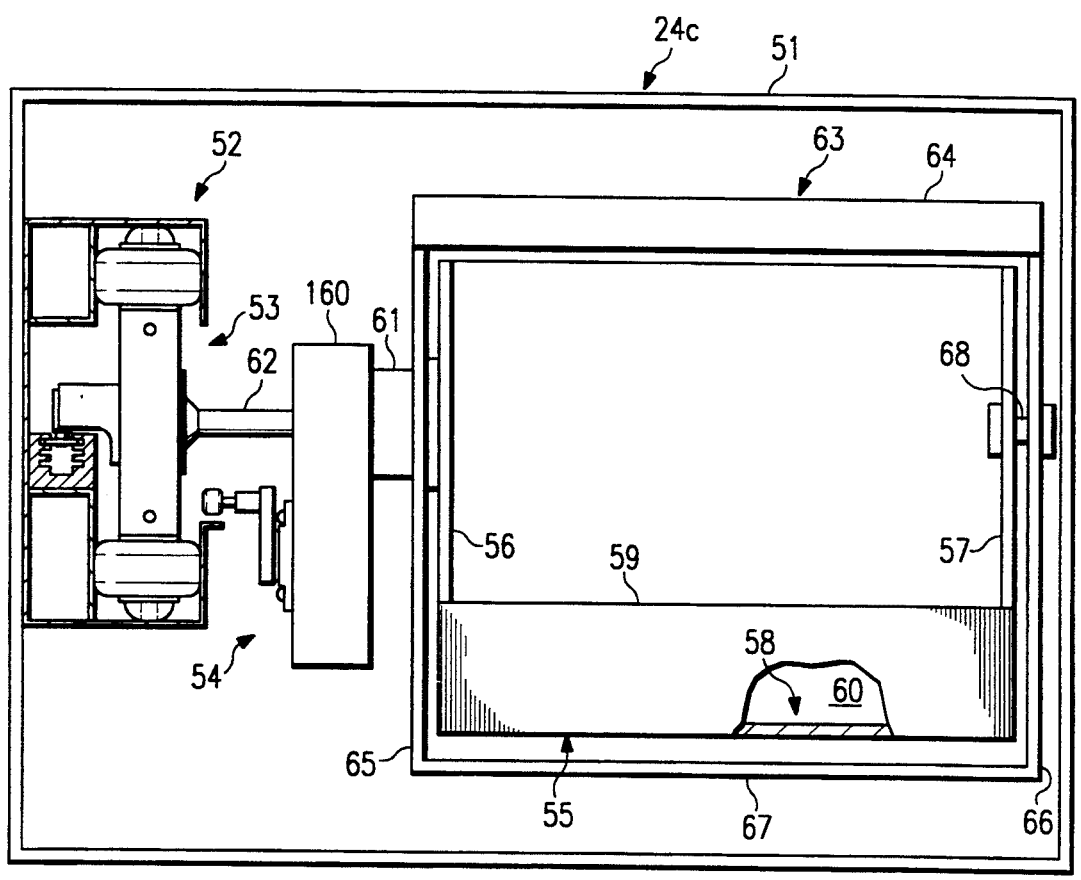
FIG. 6 is a cross sectional view taken along line 6—6 in FIG. 3, showing the carriage and the transport container.

Referring now to FIG. 6, which is a cross sectional view of the horizontal straight segment 24c of the conveyor system 16c of FIG. 3, taken in a plane perpendicular to the direction of travel of the carriage, the conveyor system comprises a housing 51, a carriage track 52, a carriage 53, a leveler mechanism 54, and the transport container 55. The transport container 55 comprises first and second end walls 56, 57 which are connected together by a bottom wall 58, a front wall 59 and a back wall (not shown, but can be identical to front wall 59). The front and back walls can be the same height as the end walls 56, 57 or a shorter height, as shown. Thus, the transport container 55 provides a chamber 60 into which the objects to be transported can be placed. The end wall 56 is secured to the end of hub 61 which is part of the leveler mechanism 54. In turn, the leveler mechanism 54 is supported on axle 62 of carriage 53. A transport container cover 63 comprises a top wall 64, first and second end walls 65, 66, and a bottom wall 67. End wall 65 has an opening therein through which the hub 61 passes with a clearance, while end wall 66 has an opening therein through which a pivot pin 68 extends with a clearance. The pivot pin 68 is fixed to the end wall 57 of the transport container 55 and is coaxial with hub 61. The front and back of the cover 63 are open so that the cover 63 is freely rotatably about the axis of hub 61 and pin 68. It is preferred that the bottom member 67 be substantially heavier than the top member 64 so that gravity will maintain the cover 63 oriented vertically.

Figure 7:
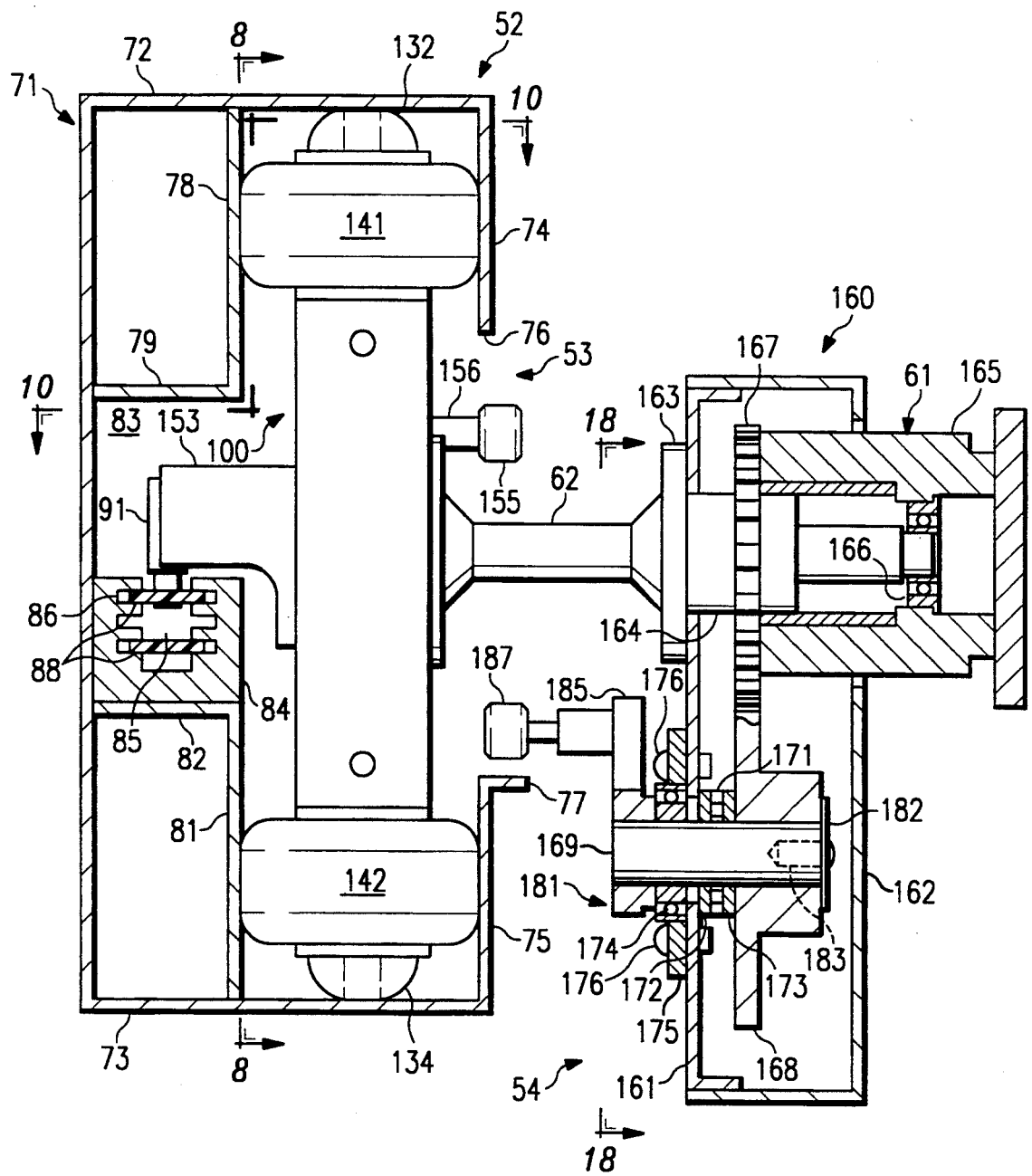
FIG. 7 is a cross sectional view of the carriage guide in a horizontal portion of the conveyor, taken along a plane perpendicular to the direction of travel of the carriage, showing an end of the carriage and a vertical cross section of the leveler mechanism.
Figure 11:
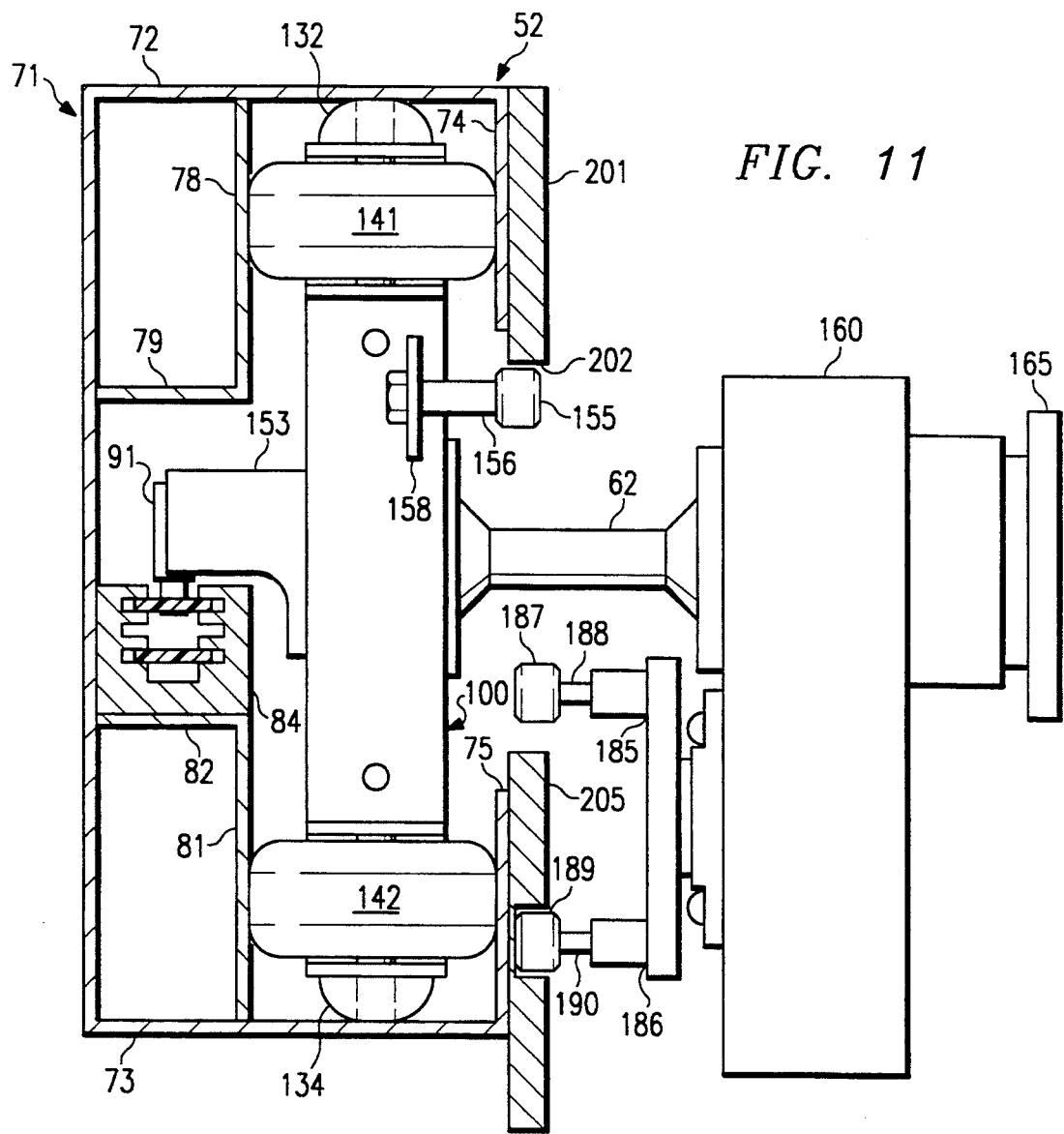
FIG. 11 is a cross sectional view of the carriage guide in a horizontal-to-vertical transition portion of the conveyor, taken along a plane which is on a radius of the curvature of the carriage guide, showing an end of the carriage and the leveler mechanism.

Referring now to FIGS. 7 and 11, the carriage guide 52 comprises a generally C-shaped member having a back wall 71, a first wall 72, a second wall 73, a first face plate 74, and a second face plate 75. Each of the first face plate 74 and the second face plate 75 is approximately one fourth of the height of the back wall 71, leaving a wide gap 76 between the inner edge of the first face plate 74 and the inner edge of the second face plate 75. A flange 77 extends outwardly from the inner edge of the second face plate 75 to serve as a cam guide. A first L shaped member having a first wall 78 and a second wall 79 is positioned in the rear corner of the guide 52 formed by walls 71 and 72, while a second L shaped member having a first wall 81 and a second wall 82 is positioned in the rear corner of the guide 52 formed by walls 71 and 73, with the height of each of the front walls 78, 81 being approximately one third of the height of the rear wall 71 such that there is a space 83 between the opposing walls 79 and 82.

Thus, the carriage guide 52 has two carriage channels which are spaced apart from each other and which have first and second channel openings facing each other. The first carriage channel is formed by the inner wall 78 and the outer wall 74 with at least the portion of the inner wall 78 which is closely adjacent to the wheels 141 and 143 being in a confronting relation with at least the portion of the outer wall 74 which is also closely adjacent to the wheels 141 and 143, and an end wall 72 joining the inner wall 78 and the outer wall 74 so as to form a first channel opening opposite the end wall 72. Similarly, the second carriage channel is formed by the inner wall 81 and the outer wall 75 with at least the portion of the inner wall 81 which is closely adjacent to the wheels 142 and 144 being in a confronting relation with at least the portion of the outer wall 75 which is also closely adjacent to the wheels 142 and 144, and an end wall 73 joining the inner wall 81 and the outer wall 75 so as to form a second channel opening opposite the end wall 73.

A tape guide 84 is positioned in the space 83, and preferably against walls 71 and 82. The tape guide 84 has an upwardly facing opening 85 extending the length of the tape guide 84. The tape guide 84 has three pair of longitudinally extending slots 86 formed in the sidewalls of the upwardly facing opening 85, with each pair of slots being in the same plane and forming a passage for the movement of tape 88 therethrough. The upper tape passage contains the drive flight of the tape 88, while the lowest tape passage contains the return flight of the tape 88. The intermediate passage can be utilized for the insertion of an alignment member into the adjacent ends of two segments of the tape guide 84 to be joined, thereby avoiding the wear on the tape due to abrasion caused by misaligned segments of the tape guide 84.

Figure 10:
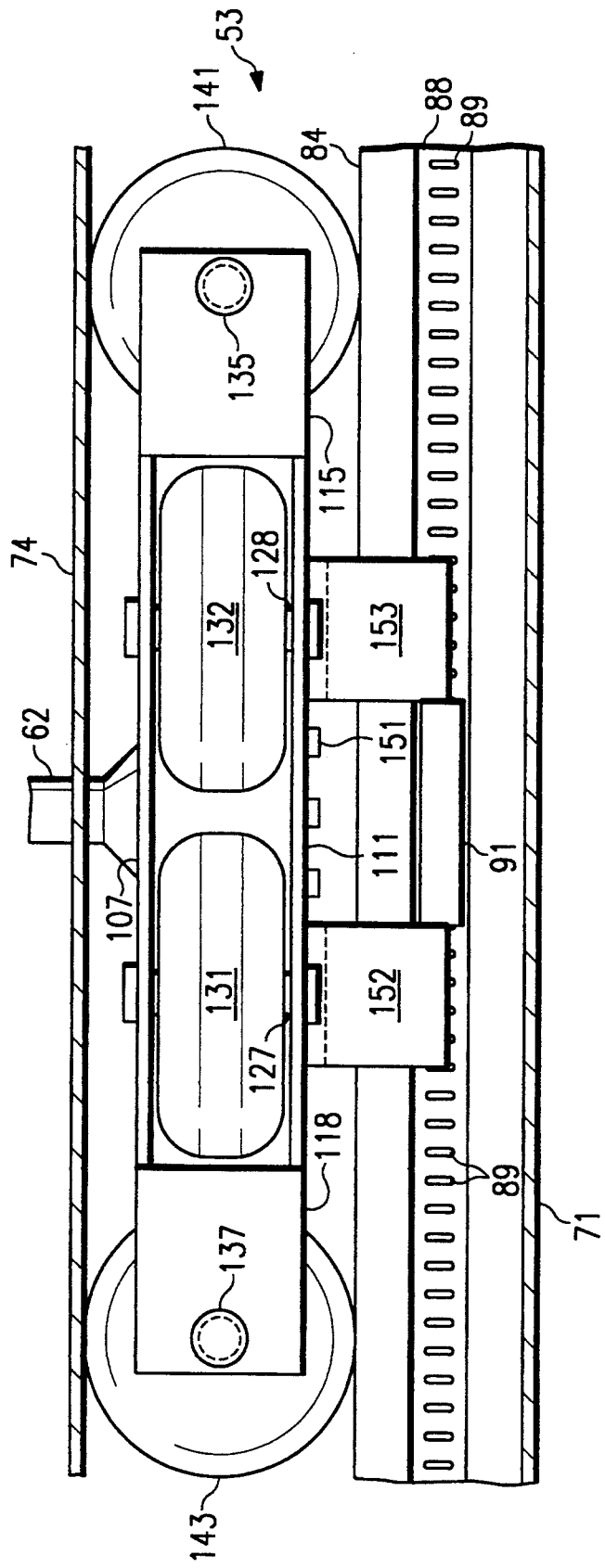
FIG. 10 is a view of the carriage and the tape conveyor, taken along line 10—10 in FIG. 7.

As shown in FIG. 10, the tape 88 is provided with a series of apertures 89 therethrough, with the apertures 89 being equally spaced apart along the longitudinal centerline of the tape 88. While the tape 88 can be bent either in the flat, i.e., a curve where the width line at each point in the bend is parallel to the other width lines in the bend, or to the edge, i.e., in a curve where the width line at each point in the bend is on a radius from the center of the curve, the flat bend requires substantially less force and considerably less distance to accomplish the bend. With one form of the plastic tape, a 90° flat bend can be readily accomplished on less than a twelve inch radius, while a corresponding edge bend requires a radius of several feet. The tape can also be readily twisted 90° about its longitudinal centerline over a relatively short distance. Commercial tapes which are suitable for use as tape 88 are the Dymetrol ® drive tapes manufactured by DuPont Company.

Figure 23:
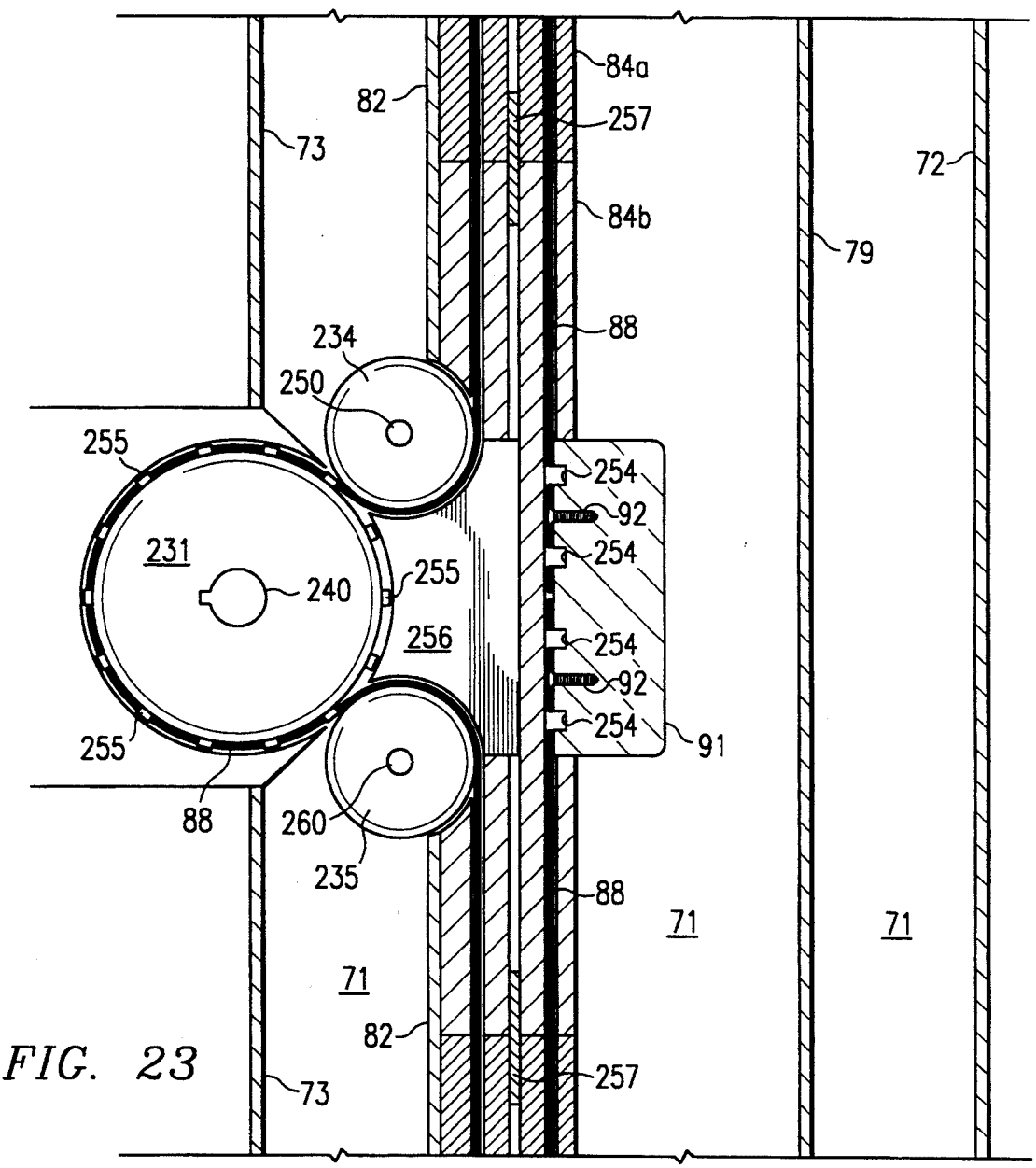
FIG. 23 is a cross sectional view of the drive tape block as it passes through the portion of the conveyor system containing the drive cog wheel.

As shown in FIGS. 7, 10, and 23, a carriage drive block 91 is secured to the tape 88 by flat head screws 92 which extend through the tape 88 at points intermediate and spaced from the apertures 89. Where the two ends of the tape 88 are joined to form an endless loop, the carriage drive block 91 can advantageously serve as the means for joining the two tape ends together.

Referring now to FIGS. 7–11, the carriage 53 has a carriage body 100 comprising a first member 101, a second member 102, a third member 103, a fourth member 104, a fifth member 105, and a sixth member 106. The first member 101 is in the form of a plate having first and second end segments 107, 108, and a center segment 109, with the center segment 109 being in the form of a U-shaped channel connecting the two end segments 107, 108. Similarly, the second member 102 is in the form of a plate having first and second end segments 111, 112, and a center segment 113, with the center segment 113 being in the form of a U-shaped channel connecting the two end segments 111, 112. The third member 103 is a U-shaped plate with an intermediate segment 114 and two end segments 115, 116 extending perpendicularly outwardly from the ends of the intermediate segment 114. Similarly, the fourth member 104 is a U-shaped plate with an intermediate segment 117 and two end segments 118, 119 extending perpendicularly outwardly from the ends of the intermediate segment 117. The fifth member 105 is a U-shaped plate with an intermediate segment 121 and two end segments 122, 123 extending perpendicularly outwardly from the ends of the intermediate segment 121. Similarly, the sixth member 106 is a U-shaped plate with an intermediate segment 124 and two end segments 125, 126 extending perpendicularly outwardly from the ends of the intermediate segment 124.

The bottom of the channel segment 109 and the bottom of the channel segment 113 are secured together with end segments 107 and 111 being adjacent to each other but spaced apart to form a first wheel chamber 110 and end segments 108 and 112 being adjacent to each other but spaced apart to form a second wheel chamber 120. Intermediate segments 114 and 117 are the same length as the plate members 101 and 102 and are secured to opposite ends of the joined plate members 101, 102 so that the flanges 115, 116 extend outwardly at one end of the carriage 53 while flanges 118, 119 extend outwardly at the other end of the carriage 53. The intermediate segments 121 and 124 are shorter than the intermediate segments 114, 117. The intermediate segment 121 is centrally positioned on and secured to intermediate segment 114 so that flange 122 is adjacent, parallel to and spaced from flange 115 while flange 123 is adjacent, parallel to and spaced from flange 116. Similarly, the intermediate segment 124 is centrally positioned on and secured to intermediate segment 117 so that flange 125 is adjacent, parallel to and spaced from flange 118 while flange 126 is adjacent, parallel to and spaced from flange 119.

First and second shafts 127 and 128 extend between and are secured to end segments 107 and 111, while third and fourth shafts 129 and 130 extend between and are secured to end segments 108 and 112, so that the longitudinal axis of each of shafts 127, 128, 129, and 130 is parallel to the longitudinal axis of axle 62. Wheels 131, 132, 133, and 134 are rotatably mounted on shafts 127, 128, 129, and 130, respectively, with the diameter of each wheel being sufficient so that the wheel extends outwardly beyond the adjacent edge of plate members 101, 102. A fifth shaft 135 extends between and is secured to flanges 115 and 122, while a sixth shaft 136 extends between and is secured to flanges 116 and 123. Similarly, a seventh shaft 137 extends between and is secured to flanges 118 and 125, while an eighth shaft 138 extends between and is secured to flanges 119 and 126. The shafts 135, 136, 137, and 138 are parallel to each other and are positioned in a plane which is perpendicular to the longitudinal axis of axle 62. Wheels 141, 142, 143, and 144 are rotatably mounted on shafts 135, 136, 137, and 138, respectively, with the diameter of each wheel being sufficient so that the wheel extends outwardly beyond the edges of the adjacent mounting flanges.

Thus, each of wheels 141 and 143 are rotatably mounted on the carriage body 100 for rotation about an axis which provides for rotation of wheels 141 and 143 along at least one of the confronting portions of the inner wall 78 and the outer wall 74 of the first carriage channel, while each of wheels 142 and 144 are rotatably mounted on the carriage body for rotation about an axis which provides for rotation of wheels 142 and 144 along at least one of the confronting portions of the inner wall 81 and the outer wall 75 of the second carriage channel. In the presently preferred embodiment of the carriage guide 52 and the carriage 53, the confronting portions of the walls 74 and 78, the confronting portions of the walls 75 and 81, and the longitudinal axes of shafts 135, 136, 137, and 138 are at least substantially parallel to each other. Similarly, each of wheels 131 and 132 are rotatably mounted on the carriage body 100 for rotation about an axis which provides for rotation of wheels 131 and 132 at least adjacent to, if not in actual contact with, end wall 72, while each of wheels 133 and 134 are rotatably mounted on the carriage body 100 for rotation about an axis which provides for rotation of wheels 133 and 134 at least adjacent to, if not in actual contact with, end wall 73. In the horizontal conveyor segments, wheels 133 and 134 ride on lower end wall 73, and it is not necessary that the wheels 131 and 132 contact the upper end wall 72. However, in the vertical conveyor segments, it is desirable that wheels 131 and 132 rotate in contact with end wall 72 and wheels 133 and 134 rotate in contact with end wall 73 in order to provide for greater stability of the carriage 53.

Figure 8:
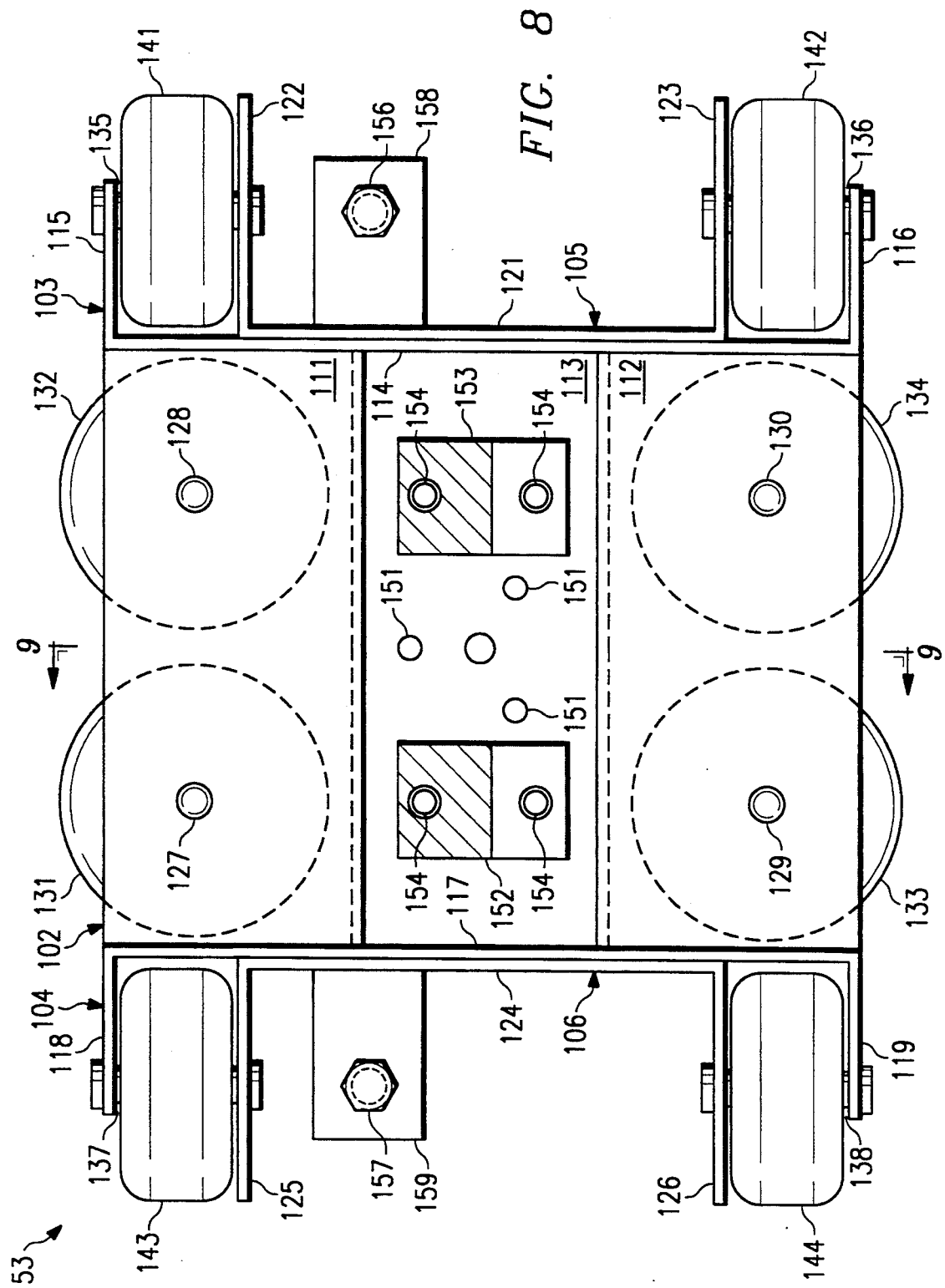
FIG. 8 is a view of the carriage taken along line 8—8 in FIG. 7.
Figure 9:
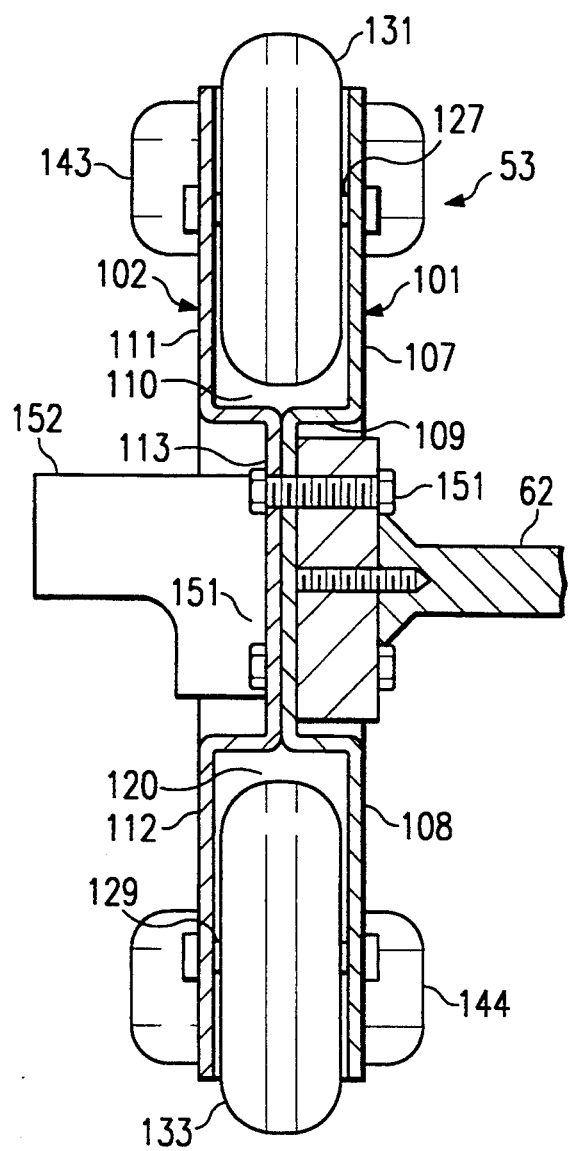
FIG. 9 is a cross sectional view of the carriage taken along line 9—9 in FIG. 8.
Figure 13:
FIG. 13 is a detail view of the relationship of the drive tape block and the carriage blocks during a left transition bend or a right transition bend between two horizontal sections of the conveyor.
Figure 14:
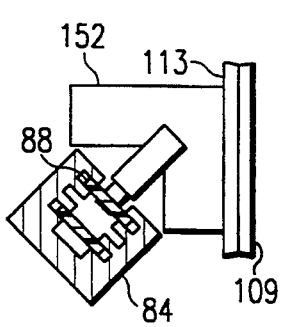
FIG. 14 is a detail view of the relationship of the drive tape block and the carriage blocks during the transition of the tape guide between the horizontal orientation of the tape of FIG. 12 and the vertical orientation of the tape of FIG. 13.

As shown in FIGS. 8 and 9, the enlarged end of axle 62 is bolted to the central portion of the joined U-shaped channels 109, 113 by three bolts 151. The carriage drive blocks 152 and 153 are also secured to the joined U-shaped channels 109, 113, on the side opposite from axle 62, by bolts 154. The carriage drive blocks 152 and 153 are spaced apart from each by a distance which is only slightly greater than the longitudinal length of tape drive block 91, so that the tape drive block 91 can be freely positioned between the carriage drive blocks 152, 153 without any direct attachment between the tape drive block 91 and the carriage drive blocks 152, 153, and any longitudinal movement of the drive tape 88 and tape drive block 91 results in a corresponding movement of one of the carriage drive blocks 152, 153 and thus of the carriage 53. The tape drive block 91 is rotatably positioned between the two carriage drive blocks 152, 153 for relative rotational movement between the tape drive block 91 and the two carriage drive blocks 152, 153. In the illustrated embodiment, the tape drive block 91 rotates about the longitudinal axis of tape 88 when the tape drive block 91 passes through a twisted section of the tape guide 84. The outer lower portion of each of carriage drive blocks 152, 153 can be omitted in order to reduce the weight of the carriage, so long as there is sufficient contact engagement between the tape drive block 91 and the leading one of the carriage drive blocks 152, 153 regardless of whether the tape 88 is positioned with its width extending horizontally, as in FIG. 12, or with its width extending vertically, as in FIG. 13, or with its width being inclined at an acute angle to the horizontal, as shown in FIG. 14.

Figure 12:
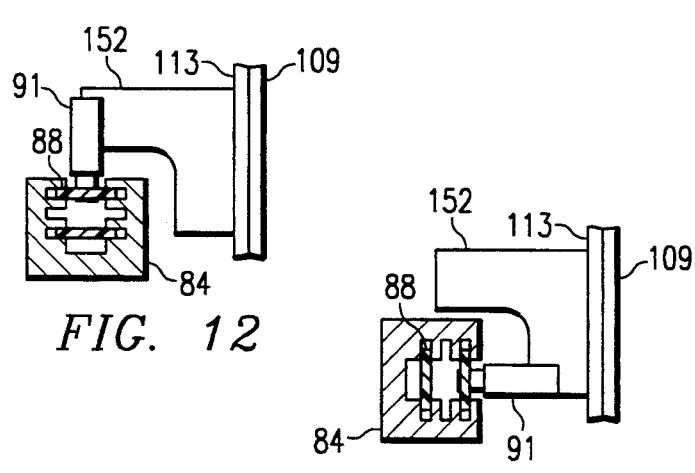
FIG. 12 is a detail view of the relationship of the drive tape block and the carriage blocks during a transition bend between a horizontal section and a vertical section of the conveyor.

FIG. 12 illustrates the relationship of the drive tape block 91 and the carriage blocks 152, 153 during a transition bend between a horizontal section and a vertical section of the conveyor system, with the width of the tape 88 being oriented horizontally in the tape guide 84. FIG. 13 illustrates the relationship of the drive tape block 91 and the carriage blocks 152, 153 during a left transition bend or a right transition bend between two horizontal sections of the conveyor system, with the width of the tape 88 being oriented vertically in the tape guide 84. The orientation of the tape guide 84 in either FIG. 12 or FIG. 13 is suitable for straight segments of the conveyor. FIG. 14 illustrates the transformation of the tape guide 84 at a point intermediate between the horizontal orientation of tape guide 84 and tape 88, as in FIG. 12, and the vertical orientation of tape guide 84 and tape 88, as in FIG. 13. FIG. 14 represents the orientation at approximately the half-way point in the twisted section of the tape guide 84. Thus, while the tape guide 84 is in the horizontal orientation of FIG. 12, the tape 88 will readily bend upwardly or downwardly and, accordingly, will easily follow a vertical curve of the tape guide 84. The orientation of FIG. 12 is equally suitable for a horizontal-to-vertical bend and a vertical-to-horizontal bend as well as any other vertical bend of less than about 180°. Similarly, while the tape guide 84 is in the vertical orientation of FIG. 13, the tape 88 will readily bend leftwardly or rightwardly and, accordingly, will easily follow a horizontal curve of the tape guide 84. The orientation of FIG. 13 is equally suitable for a leftward horizontal bend of less than about 180° and a rightward horizontal bend of less than about 180°. Therefore, if the tape guide 84 is in the horizontal orientation of FIG. 12 and a sidewise curve is desired, a short section of the tape guide 84 is formed with a 90° clockwise twist, as viewed in FIGS. 7 and 11, over its length to achieve the orientation of FIG. 13. Similarly, if the tape guide 84 is in the vertical orientation of FIG. 13 and a vertical curve is desired, a short section of the tape guide 84 is formed with a 90° counterclockwise twist, as viewed in FIGS. 7 and 11, over its length to achieve the orientation of FIG. 12. FIG. 14 shows the tape guide 84 at the midpoint of the length of a twisted section of tape guide 84.

As shown in FIGS. 7 and 8, two cam followers 155 are rotatably mounted on shafts 156 and 157, respectively. Shafts 156 and 157 are fixed to flanges 158 and 159, respectively, which in turn are fixed to the intermediate segment 121 of the fifth member 105 and the intermediate segment 124 of the sixth member 106, respectively, such that shafts 156 and 157 are parallel to axle 62 and extend from the body of the carriage 53 towards the transport container 55. In the horizontal conveyor segment illustrated in FIG. 7, the cam followers 155 are positioned slightly below the lower edge of outer face plate 74.

As shown in FIGS. 7, 10, and 11, the carriage 53 is positioned in the two carriage channels of carriage track 52 with the wheels 141 and 143 engaging the parallel portions of walls 74 and 78, wheels 142 and 144 engaging the parallel portions of walls 75 and 81, wheels 131 and 132 engaging end wall 72, and wheels 133 and 124 engaging end wall 73. The carriage drive blocks 152 and 153 extend into the space 83, overlying the opening 85 in the tape guide 84. In the horizontal segments of the conveyor system, the weight of the transport container 55 and the carriage 53 is on wheels 133 and 134 riding on bottom end wall 73. The twisting forces due to the transport container 55 being supported by axle 62 in a cantilever fashion are born by wheels 141, 143 against first face plate 74 and by wheels 142, 144 against wall 81. In the vertical conveyor segments at the operator station and the customer station, the weight of the transport container 55 and the carriage 53 is on the tape drive block 91, while the upper one of wheels 141, 143 presses against face plate 74 and the other one presses against wall 78, and the upper one of wheels 142, 144 presses against face plate 75 and the other one presses against wall 81.

Figure 18:
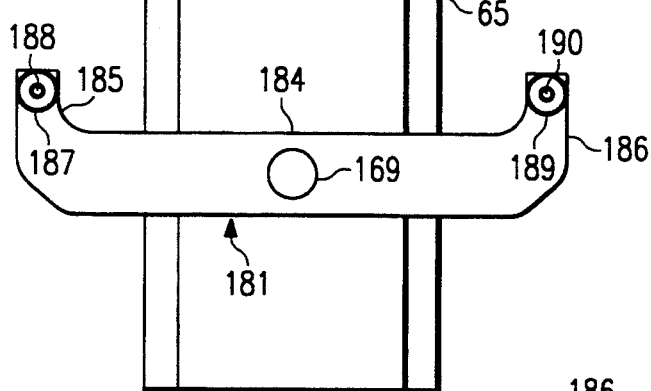
FIG. 18 is an elevational view of the leveler mechanism, taken along line 18—18 in FIG. 7, when the carriage is traveling horizontally.

Referring now to FIGS. 6, 7, and 18, the case 160 of the leveler mechanism 54 comprises a base plate 161 and a cover plate 162. An annular flange 163 on an enlarged intermediate portion 164 of axle 62 is bolted to the base plate 161 with the enlarged intermediate portion 164 extending through an opening in base plate 161. Thus, the case 160 has a fixed orientation with respect to the carriage 53. Annular hub 61 is positioned coaxially with axle 62, with the outer end 165 of annular hub 61 being supported by an annular ball bearing 166 positioned between axle 62 and hub 61. The outer end 165 of annular hub 61 extends outwardly through an opening in cover plate 162 and is secured to transport container 55. An annular hub gear 167 is secured to the inner end of hub 61 so as to be rotatable about the enlarged portion 164 of axle 62. A leveler arm gear 168 is positioned coaxially with and secured to leveler arm shaft 169. The leveler arm shaft 169 extends through an opening in base plate 161, with gear 168 being spaced from the base plate 161 by a thrust needle roller bearing 171 positioned between two washers 172, 173 which are positioned about and coaxially with shaft 169. The leveler arm shaft 169 is supported by a roller ball bearing 174 which is positioned coaxially with shaft 169 on the outside of case 160. The bearing 174 is held in place by a washer 175 which is secured to the base plate 161 by bolts 176.

Figure 19:
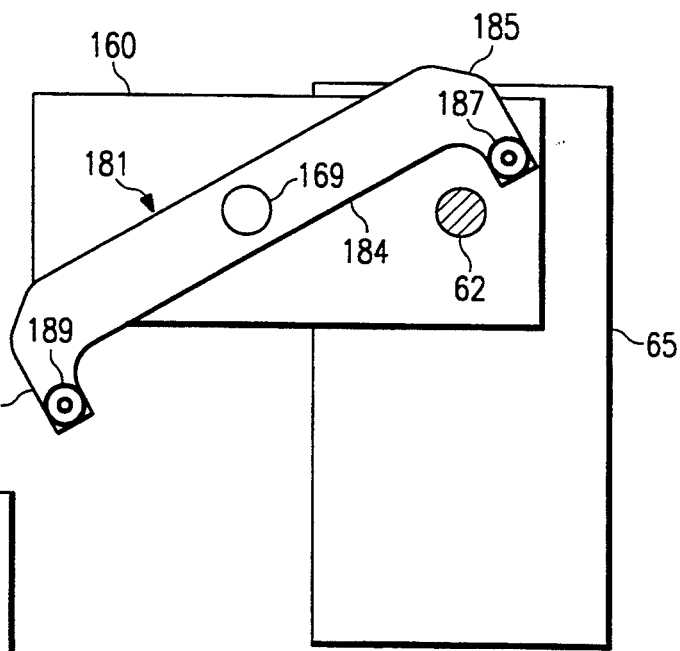
FIG. 19 is an elevational view of the leveler mechanism, taken along a line which corresponds to line 18—18 in FIG. 7, when the carriage is traveling vertically at one end of the conveyor.
Figure 20:
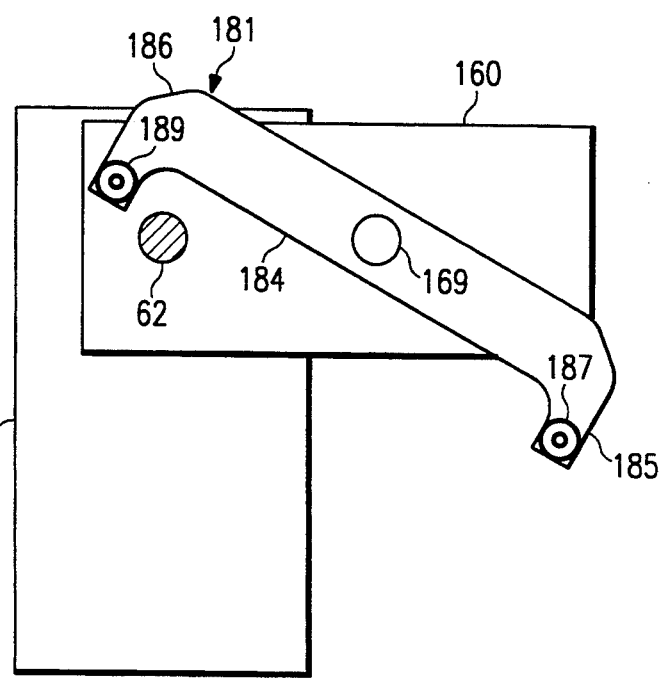
FIG. 20 is an elevational view of the leveler mechanism, taken along a line which corresponds to line 18—18 in FIG. 7, when the carriage is traveling vertically at the other end of the conveyor.

A leveler arm 181 is fixedly mounted on the outer end of shaft 169, while a plate 182 is secured to the inner end of shaft 169 by bolt 183, with plate 182 engaging the end face of leveler arm gear 168, thereby securing the leveler arm assembly together. As shown in FIGS. 18-20, the leveler arm 181 has an elongated intermediate portion 184 and first and second projecting end portions 185 and 186. A first cam follower 187 is mounted on shaft 188 which is secured to the first projecting end portion 185 of the leveler arm 181. Similarly, a second cam follower 189 is mounted on shaft 190 which is secured to the second projecting end portion 186 of the leveler arm 181. The shafts 188 and 190, which are parallel to leveler arm shaft 169 and axle 62, are fixedly secured to leveler arm 181, while the cam followers 187 and 189 freely rotate about their respective shaft. Mounting of the cam followers 187 and 190 on the projecting end portions 185, 186 provides an offset from the longitudinal axis of leveler arm shaft 169.

Figure 15:
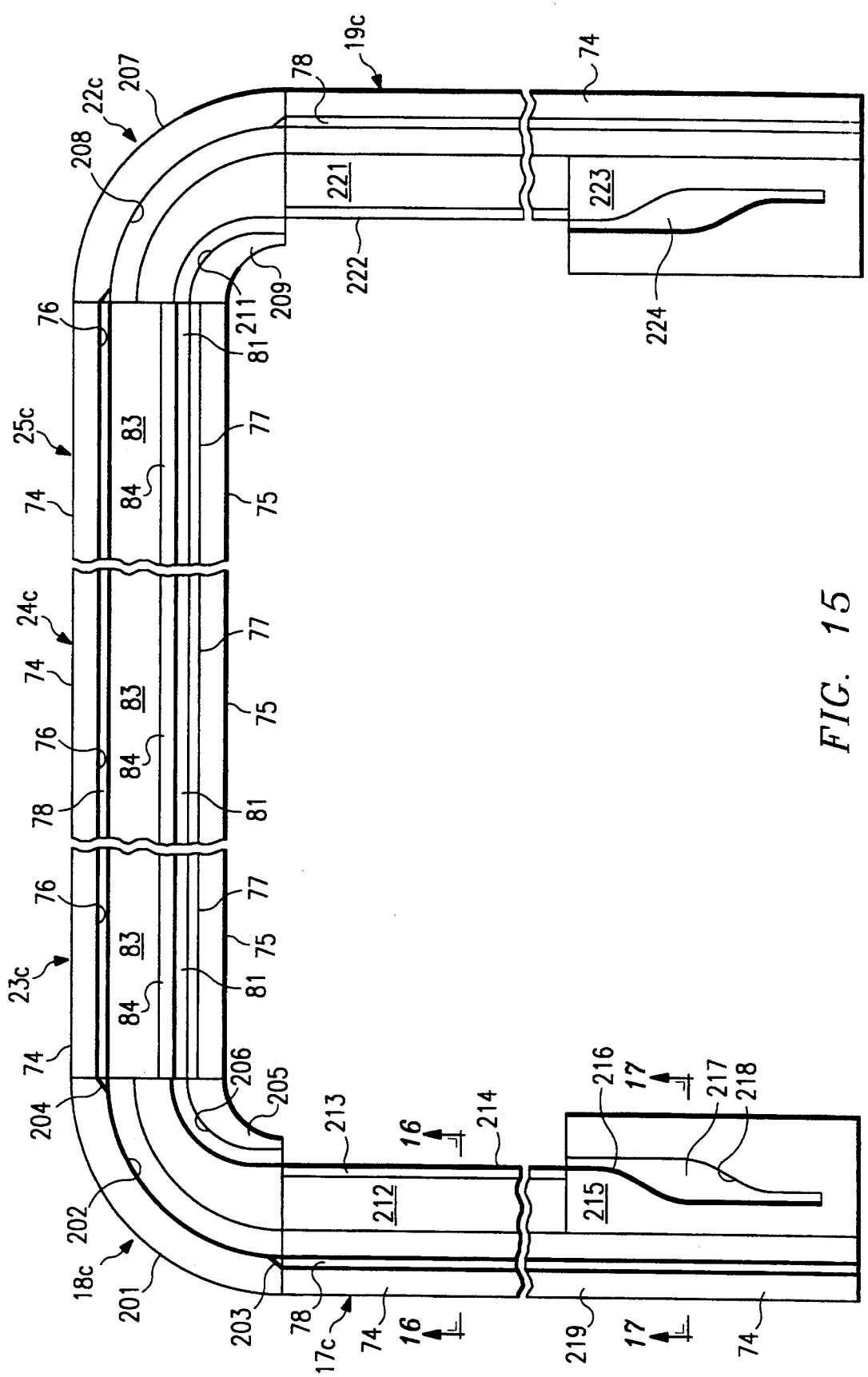
FIG. 15 is an elevation view of portions of the carriage track and camways for the conveyor of FIG. 3 in accordance with a first embodiment of the invention.

Referring now to FIG. 15, an elevation view of portions of the carriage track 52 and camways for the conveyor of FIG. 3 has been broken and converted to a single plane for simplicity in illustration. The carriage track 52 in each of the vertical segment 17c, the vertical-to-horizontal transition segment 18c, the horizontal-to-horizontal transition segment 23c, the straight segment 24c, the horizontal-to-horizontal transition segment 25c, the horizontal-to-vertical transition segment 22c, and the vertical segment 19c has the transverse cross-sectional configuration as shown for carriage track 52 in FIGS. 7 and 11, except that the cam guide 77 is present only in the horizontal segments, recognizing, of course, that each of the segments 17c, 24c, and 19c has a straight longitudinal profile, while each of segments 18c, 23c, 25c, and 22c has a curved longitudinal profile and that the tape guide 84 has twist sections to provide a transition between the horizontal orientation of FIG. 12 and the vertical orientation of FIG. 13.

Referring to FIGS. 11 and 15, an outer cam plate 201 is positioned over the outer face plate 74, with the radial width of cam plate 201 being greater than the radial width of outer face plate 74 so that cam plate 201 extends inwardly beyond the inner edge of outer face plate 74 to provide a cam surface 202. In the initial portion of the cam plate 201 contiguous to the segment 17c, the cam plate 201 can have a taper 203 so that the cam surface 202 merges with the inner edge of outer face plate 74 of segment 17c. Similarly, in the initial portion of the cam plate 201 contiguous to the segment 23c, the cam plate 201 can have a taper 204 so that the cam surface 202 merges with the inner edge of outer face plate 74 of segment 23c. While the cam followers 155 are spaced from the inner edge of outer face plate 74, and thus do not make any contact with any cam surfaces in the horizontal segments of the conveyor system, the cam plate 201 extends inwardly sufficiently for the cam followers 155 to make contact with the cam surface 202 when the carriage 53 is in the horizontal-to-vertical transition segment 18c. The tapered areas 203 and 204 guide the cam followers onto the cam surface 202 when the carriage 53 enters the transition segment 18c. In view of the presence of two sets of wheels 131, 133 and 132, 134, there cannot be a single radial line of contact between these wheels and the carriage track 52 as the carriage 53 moves through a horizontal-to-vertical transition. Thus, the cam surface 202 and the cam followers 155 maintain an inwardly directed force on the carriage 53 as the carriage 53 moves through the horizontal-to-vertical transition, thereby maintaining a smoother passage of the carriage 53 through the transition.

As shown in FIGS. 11 and 15, an inner cam plate 205 is positioned over the inner face plate 75, with the radial width of cam plate 205 being greater than the radial width of inner face plate 75 so that cam plate 205 extends outwardly, or upwardly, beyond the outer upper edge of inner face plate 75, such that at the joindure of the segments 18c and 23c the top or camming surface of cam guide 77 lines up with the lower side wall of a cam way slot 206, which is formed in the cam plate 205. While the upper outer edge of cam plate 205 follows a curvature having an at least substantially uniform radius, the two sidewalls of the cam way slot 206 move inwardly and downwardly with a decreasing radius as the transition segment converts from horizontal to vertical, thereby causing a rotating movement of the leveler arm 181 as the leading cam follower 189 leaves the cam guide 77 to enter the cam way slot 206 and then follows the cam way slot 206 downwardly. The cam plate 205 also extends inwardly and downwardly beyond the lower edge of inner face plate 75, so as to provide the necessary inwardly directed curvature for cam way slot 206.

The horizontal-to-vertical transition segment 22c has a construction which is a mirror image of the construction of horizontal-to-vertical segment 18c, and accordingly is provided with an outer cam plate 207 having a cam surface 208 corresponding to outer cam plate 201 and cam surface 202, as well as an inner cam plate 209 having a cam way slot 211 corresponding to inner cam plate 205 and cam way slot 206. Again, while the outer edge of cam plate 209 follows a curvature having an at least substantially uniform radius, the two sidewalls of the cam way slot 211 move inwardly and downwardly with a decreasing radius as the transition segment converts from horizontal to vertical, thereby causing a rotating movement of the leveler arm 181 as the leading cam follower 187 leaves the cam guide 77 to enter the cam way slot 209 and then follows the cam way slot 209 downwardly.

Figure 16:
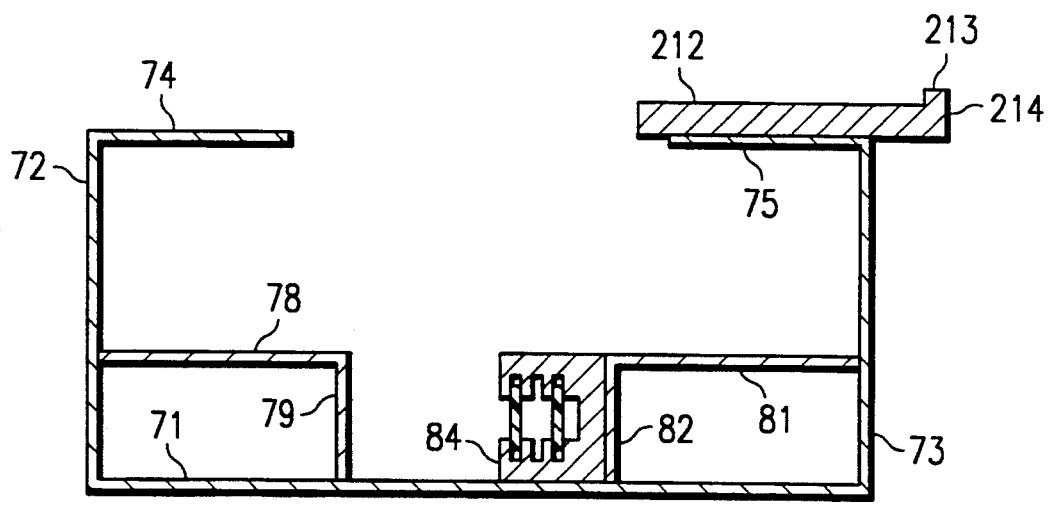
FIG. 16 is a cross sectional view of the carriage track taken along line 16—16 in FIG. 15.

As shown in FIGS. 15 and 16, an inner cam plate 212, having a flange 213 along its inner edge to provide a cam guide surface 214, is positioned over the inner face plate 75, with the width of cam plate 212 being greater than the width of inner face plate 75 so that cam plate 212 extends both outwardly beyond the outer edge of inner face plate 75 and inwardly beyond the inner edge of inner face plate 75, such that at the joindure of the segments 18c and 17c the camming surface 214 of flange 213 lines up with the outer side wall of the cam way slot 206 of the cam plate 205. During the movement of the carriage 53 through the upper portion of vertical segment 17c, the cam follower 189 is positioned closely adjacent to the cam surface 214. While under normal circumstances there is no significant contact between cam follower 189 and the cam guide surface 214, the close proximity of the cam follower 189 to the surface 214 will prevent any significant outward motion of the transport container 55 about axle 62. Similarly, the close proximity of the trailing cam follower 187 to the axle 62, as shown in FIG. 19, will prevent any significant inward motion of the transport container 55 about axle 62. Such rocking motion is prevented during the passage of the carriage 53 through the horizontal segments by the fact that both the leading cam follower and the trailing cam follower simultaneously ride on the cam surface of cam guide 77.

Figure 17:
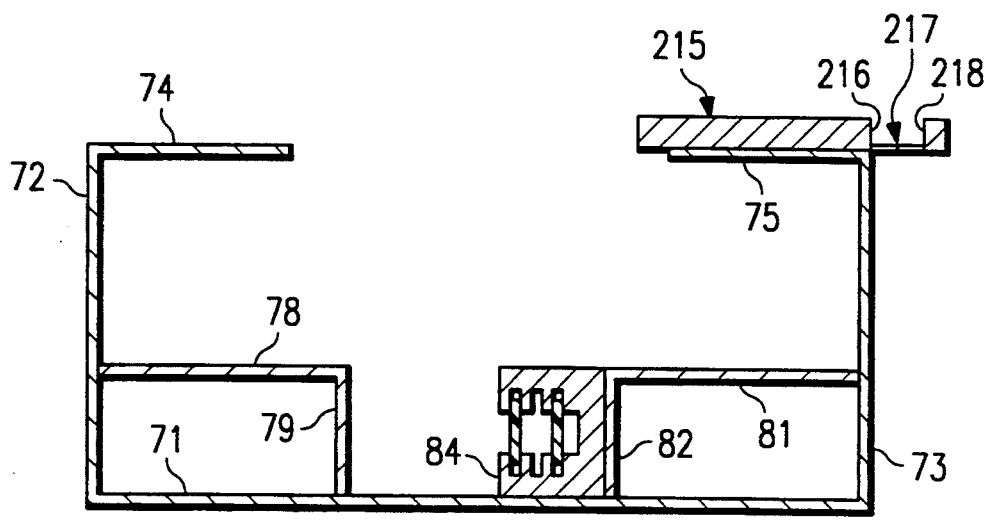
FIG. 17 is a cross sectional view of the carriage track taken along line 17—17 in FIG. 15.

As shown in FIGS. 15 and 17, an inner cam plate 215 is positioned over the inner face plate 75, with the width of cam plate 215 being greater than the width of inner face plate 75 so that cam plate 215 extends both outwardly beyond the outer edge of inner face plate 75 and inwardly beyond the inner edge of inner face plate 75, such that at the joindure of the cam plates 212 and 215 the camming surface 214 of flange 213 lines up with the outer side wall 216 of the cam way slot 217 of the cam plate 215. The cam way slot 217 has an upper section wherein its inner sidewall 218 is at least substantially parallel to the outer side wall 216, a center section wherein the inner and outer sidewalls 216, 218 diverge to a larger spacing and then converge again, and a lower section wherein the inner and outer sidewalls 216, 218 are at least substantially parallel. The resulting hysteresis curve causes the leveler arm assembly to rotate the transport container 55 approximately 30° to 60° about a horizontal axis, while the cover 63 remains vertically oriented thereby opening the transport container to the customer via the opening 36c or the opening 37c.

The vertical segment 19c has a construction which is a mirror image of the construction of vertical segment 17c, and accordingly is provided with an inner cam plate 221 having a cam surface 222 corresponding to inner cam plate 212 and cam surface 214, as well as an inner cam plate 223 having a cam way slot 224 corresponding to inner cam plate 215 and cam way slot 217.

FIG. 18 depicts the relationship of the cover 65 of the transport container 55, the leveler arm case 160, leveler arm 181, and the cam followers 187 and 189 while the carriage 53 is in a horizontal segment of the conveyor system, wherein both of the cam followers 187 and 189 are simultaneously riding on the cam surface 77. FIG. 19 depicts the relationship of these elements when the leading cam follower 189 has entered the cam way slot 206 and the carriage 53 has completed the transition from horizontal segment 23c to vertical segment 17c. The orientation of the leveler arm case 160 to the carriage 53 is fixed by axle 62, and accordingly case 160 rotates from the vertical orientation of FIG. 18 to the horizontal orientation shown in FIG. 19 as the carriage 53 makes the change from the horizontal segment 23c to the vertical segment 17c. However, the engagement of the cam follower 189 with the cam way slot 206 has caused the leveler arm 181 and its shaft 169 to rotate about the longitudinal axis of shaft 169. This rotation of shaft 169 causes a corresponding rotation of leveler arm gear 168 which in turn rotates hub gear 167, which in turn rotates hub 61 and the transport container 55 about the axis of hub 61 such that the transport container 55 retains its vertical orientation throughout the transition of the carriage 53 from the horizontal segment 23c to the vertical segment 17c.

FIG. 20 depicts the relationship of these elements when the leading cam follower 187 has entered the cam way slot 211 and the carriage 53 has completed the transition from horizontal segment 25c to vertical segment 19c. The case 160 rotates from the vertical orientation of FIG. 18 to the horizontal orientation shown in FIG. 20 as the carriage 53 makes the change from the horizontal segment 25c to the vertical segment 19c. However, the engagement of the leading cam follower 187 with the cam way slot 211 has caused the leveler arm 181 and its shaft 169 to rotate about the longitudinal axis of shaft 169. This rotation of shaft 169 causes a corresponding rotation of leveler arm gear 168 which in turn rotates hub gear 167, which in turn rotates hub 61 and the transport container 55 about the axis of hub 61 such that the transport container 55 retains its vertical orientation throughout the transition of the carriage 53 from the horizontal segment 25c to the vertical segment 19c.

Figure 21:
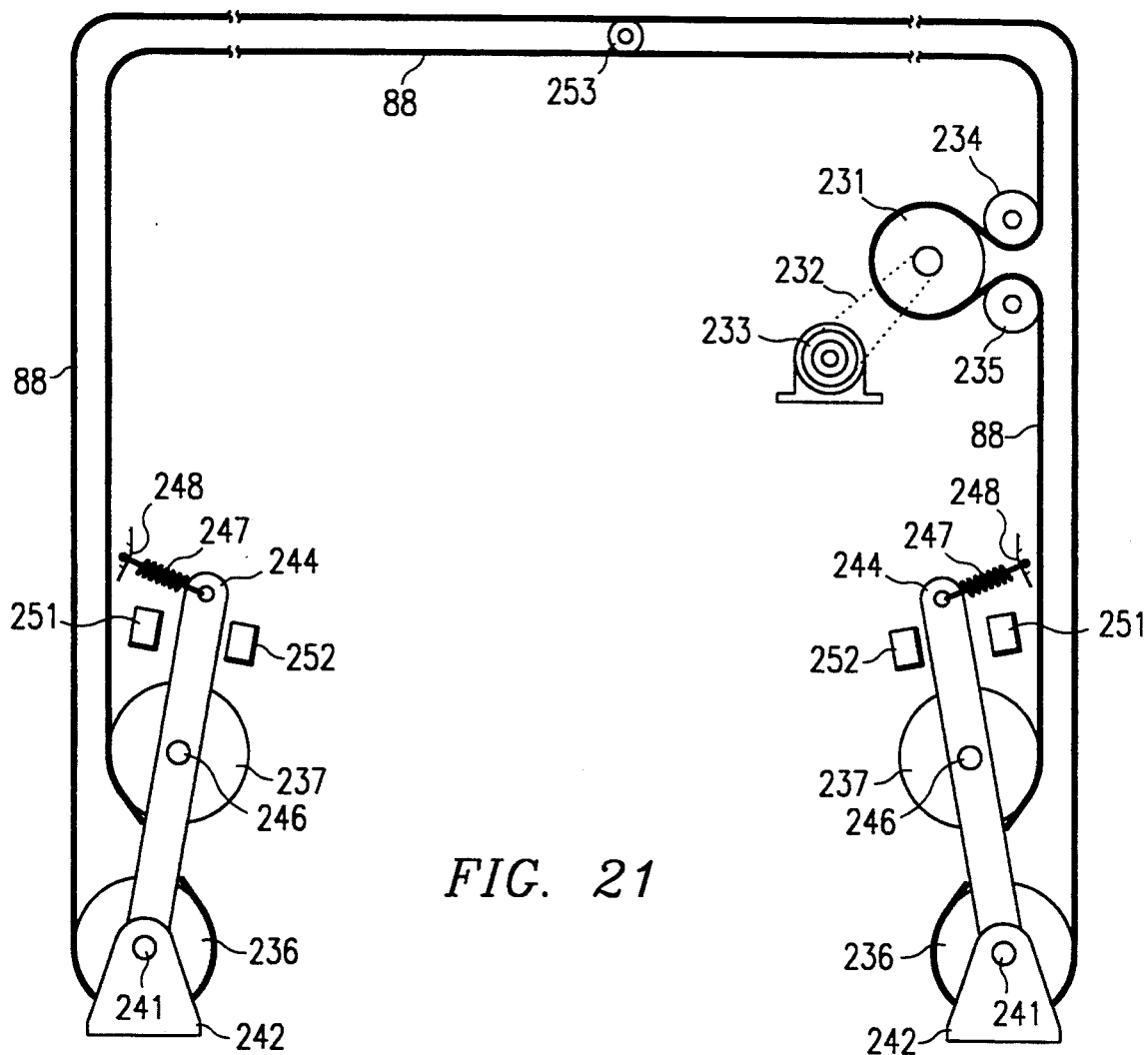
FIG. 21 is a diagrammatic view of the path of the drive tape in an endless loop embodiment.
Figure 22:
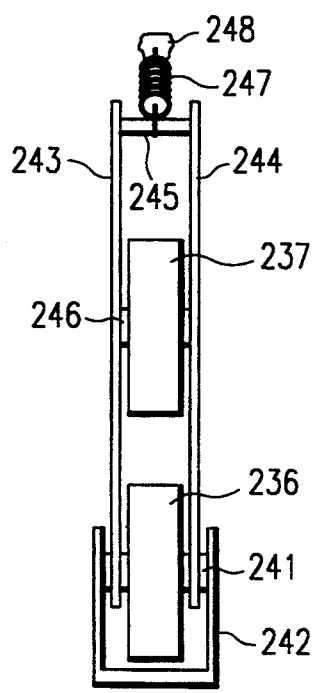
FIG. 22 is a detail view of one of the tensioning mechanisms of FIG. 20.

Referring now to FIGS. 21–23, the tape 88 is formed into an endless loop by its ends being secured to the tape drive block 91. The tape 88 is driven by a cog wheel 231 having teeth which enter the perforations 89 in the tape 88. The cog wheel 231 is driven via a pulley 232 by a bidirectional motor 233. The cog wheel 231 is positioned adjacent and between two idler rolls 234 and 235 so that the tape 88 passes partially around one of the idler rolls 234, 235, then passes partially around the cog wheel 231, and then passes partially around the other one of the idler rolls 234, 235.

A pair of tension rolls 236, 237 is positioned at the end of the tape loop at the customer station, while an identical set of tension rolls 236, 237 is positioned at the end of the tape loop at the operator station. As the two sets are identical, only one will be described. Roll 236 is rotatably mounted on shaft 241, which is supported by frame element 242. One end of each of lever arms 243 and 244 is also rotatably mounted on shaft 241, while the other ends of the lever arms 243 and 244 are joined together by a rod 245. Roll 237 is rotatably mounted on shaft 246 which is supported by the lever arms 243, 244 at a location intermediate the ends of the lever arms 243, 244. The tape 88 passes by the roll 237 and then partially around roll 236. A spring 247, connected between rod 245 and frame element 248, biases the roll 236 against the tape 88 to thereby apply tension to the tape 88. Stops 251 and 252 are positioned on opposite sides of the lever arms to limit the degree of movement of the lever arms 243, 244. The two sets of tension rollers maintain tension on the tape 88, regardless of the direction in which the tape 88 is being driven, as well as smoothing out any tendencies for the drive tape 88 to experience stutter at any point in the operation.

If desired, a roll 253, having teeth to enter the apertures 89 of the tape 88 can be positioned at an intermediate location so as to engage both the drive run of the tape and the return run of the tape. In order for the tape drive block 91 to pass by the roll 253, the drive block 91 can be provided with apertures 254 in its surface which is contiguous to the tape 88 with these apertures in the block 91 being in alignment with the apertures 89 of the tape 88, as illustrated in FIG. 23. This results in the carriage 53 being pulled by one portion of the tape 88, regardless of the direction the tape 88 is being driven, when the carriage 53 is in the portion of the conveyor path containing the roll 253 and the cog wheel 231.

While roll 253 is useful with the endless loop tape illustrated in FIG. 21, it is particularly advantageous where the tape 88 has a discrete length with a leading edge and a trailing edge rather than being in the form of an endless loop. For example, with a discrete length tape having a drive cog wheel located in the portion of the conveyor path including the customer station, the discrete length tape can easily raise or lower the carriage 53 in the vertical segment at the operator station without subjecting the tape to compression along its longitudinal axis. Similarly, the discrete length tape can easily pull the carriage 53 along the intermediate horizontal segment in one direction without any compressive force on the tape, and can push the carriage 53 along the intermediate horizontal segment in the opposite direction with only a small compressive force on the tape resulting primarily from the rolling friction encountered by the carriage. However, in the vertical segment at the customer station, the discrete length tape is forced to push the carriage upwardly from the customer station to the intermediate horizontal segment, thereby subjecting the tape to substantial compressive forces along its longitudinal axis. Similarly, during the movement of the carriage downwardly in the vertical segment at the customer station, the weight of the carriage 53 and the transport container 55 and its contents tend to move the carriage 53 downwardly faster than the movement of the tape and thus tend to compress the portion of the tape between the carriage 53 and the drive wheel 231.

However, if the toothed roll 253 is located in an intermediate segment of such conveyor system employing a discrete length drive tape, and the carriage drive block 91 is secured to the tape at an intermediate point on the length of the tape such that the toothed roll 253 remains in engagement with the tape in both the upper and the lower tape runs 86 in the tape guide 84 regardless of the position of the carriage 53 in the conveyor system, the carriage 53 is pulled upwardly in the vertical segment at the customer station by the trailing portion of the tape via the toothed roll 253 as well as being pushed upwardly by the leading portion of the tape, where the trailing portion of the tape is the portion moving from the toothed roll 253 toward the drive wheel 231 and the leading portion of the tape is the portion moving from the drive wheel 231 to the toothed roll 253. Corresponding results are achieved with a discrete length drive tape where the drive cog wheel is located in the portion of the conveyor path including the operator station. This substantially reduces the compressive forces to which the tape is subjected, thereby increasing the operation life of the tape.

When the tape 88 has been passed in a straight run onto the periphery of a cog wheel and then withdrawn from the cog wheel in a straight run, a problem has been encountered in that while the spacing of the apertures in the tape and the spacing of the cog teeth at their base is nominally the same, the curved path around a portion of cog wheel creates compression of the tape along its inner surface and stretching of the tape along its outer surface, causing the tape 88 to bind on the teeth of the cog wheel, resulting in a periodic jerking motion of the tape. This creates wear on tape and requires additional energy to drive the tape. While peeling devices have been proposed in an effort to overcome this problem, they are, in effect, prying the tape off the tooth. If the crown of each of the cog teeth is rounded off to limit this problem, the contact area between the driving teeth and the tape is reduced, thereby reducing the load capacity of the tape.

In accordance with the present invention, it has been discovered that this problem can be avoided by passing the tape 88 from the straight run partially around a first idler roll and then at least substantially immediately onto the cog wheel 231, and then passing the tape from the cog wheel at least substantially immediately around a portion of the periphery of a second idler roll and into a straight run. Thus, the drive tape 88 curves away from the cog wheel 231 in a reverse curvature to that of the drive tape 88 about the cog wheel 231, not only relieving the compression on the surface of the drive tape 88 which had been in contact with the cog wheel 231, but also placing that tape surface in tension for a short distance. This results in the dimensions of the tape surface which is in contact with the cog wheel 231 being temporarily increased as the drive tape 88 is raising off the cog wheel 231, thereby permitting the tape 88 to clear the tooth 255 without significant resistance, thereby substantially reducing the wearing of the drive tape 88.

Referring now to FIG. 23, cog wheel 231 is rotatably mounted on shaft 240, while idler rolls 234 and 235 are rotatably mounted on shafts 250, 260, respectively, with shafts 240, 250 and 260 being parallel to each other. The cog wheel 231 is provided with a plurality of teeth 255 equally spaced about its at least substantially cylindrical periphery, so that the teeth 255 enter the apertures 89 of the tape 88 as the tape 88 passes around cog wheel 231. If desired, the spacing between the centers of adjacent teeth 255 can be equal to the spacing between the centers of adjacent apertures 89, or the spacing between the centers of adjacent teeth 255 can be equal to a whole number multiple of the spacing between the centers of adjacent apertures 89. Each of the idler rolls 234, 235 has a smooth at least substantially cylindrical surface over which the tape 88 passes, so that the only mechanical engagement of the tape 88 is by the teeth 255 on the cog wheel 231. The cog wheel 231 is positioned adjacent to and between first and second idler rolls 234, 235 such that the drive tape 88 passes in contact with the at least substantially cylindrical periphery of one of the idler rolls 234, 235, then passes in contact with the at least substantially cylindrical periphery of the cog wheel 231, and then passes in contact with the at least substantially cylindrical periphery of the other one of the idler rolls 234, 235.

The diameter of the cog wheel 231 should be at least as great as the diameter of the two idler rolls 234, 235, and preferably should be larger than the diameter of the idler rolls 234, 235 but less than about twice the diameter of the idler rolls 234, 235. In other words, each of the idler rolls 234, 235 has a diameter which is between about 50 and about 100 percent of the diameter of the cog wheel 231. In general, the tape 88 will pass around at least about 60°, and preferably between about 90° and about 150° of the circumference of each of the idler rolls 234, 235, while passing around at least about 120°, and preferably in the range of about 180° to about 300° of the circumference of the cog wheel 231. It is presently preferred that the tape 88 leave the first idler wheel and contact the cog wheel 231 without any substantial length of straight path therebetween. Similarly, it is presently preferred that the tape 88 leave the cog wheel 231 and contact the second idler wheel without a substantial length of straight path therebetween. In a presently preferred embodiment, the tape 88 is tangent to idler wheel 234 and to cog wheel 231 at a common point, and is also tangent to idler wheel 235 and to cog wheel 231 at a common point. While it is presently preferred that the peripheries of each of the idler rolls 234, 235 and the cog wheel 231 be a cylindrical surface, it is possible for the peripheral surfaces to have a raised central portion, i.e., the diameter at the midpoint of the thickness of the roll or wheel being slightly greater than the diameter at the top and bottom edges.

As illustrated in FIG. 23, a section of the tape guide 84 has been cut part way through so as to expose the lower inner tape channel and to permit the idler rolls to be mounted immediately adjacent the cut section of the tape guide 84 so that the tape 88 from the tape guide 84 contacts the first roll at a tangent thereto and the tape leaves the second roll and reenters the tape guide 84 on a tangent to the second roll. To further assist in the separation of the tape 88 from the cog roll 231 and to prevent a space where the tape 88 could form accordion pleats, a shaped member 256 is positioned between the two idler rolls 234, 235 and adjacent to the free surface of cog roll 231 to provide a mating structure for the tape guide 84 and to restrict the space between the member 256 and each of the rolls 231, 234, 235, to a dimension only slight greater than the thickness of the tape and preferably at least substantially identical to the corresponding channel in the tape guide 84. As shown in FIG. 23, alignment elements 257 can be inserted in the middle channel of the tape guide 84 of each end of two tape guide sections 84a, 84b being joined.

The drive mechanism of FIG. 23 is applicable to tape conveyor systems which have a mono-planar path as well as tape conveyor systems which have a multi-planar path. It is also applicable to tape drives for systems other than conveyor systems, e.g., operating systems such as garage door openers, window opening/closing systems, etc.

Figure 24:
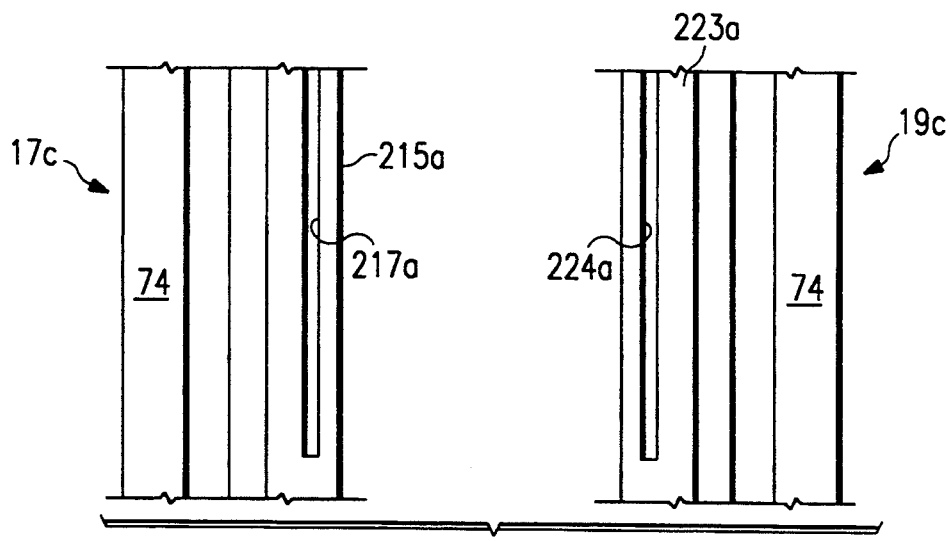
FIG. 24 is an elevation view of portions of the carriage track and camways for the conveyor of FIG. 3 in accordance with a second embodiment of the invention.

Referring now to FIG. 24, the cam plates 215a and 223a are provided on the lower portion of vertical segments 17c and 19c in a second embodiment of the invention, wherein the cam slots 217a and 224a have a substantially uniform transverse width throughout their length and are at least substantially vertical. This configuration of the cam slots 217a, 224a results in the orientation of the transport container 55 remaining vertical throughout its travel, including the final movement into and the initial movement out of each of the customer station and the operator station. This is necessary for food service facilities where drink containers should be maintained in a vertical orientation. It is also particularly advantageous for use in conveyor systems for transporting test tubes containing body fluids for medical examination.

Figure 25:
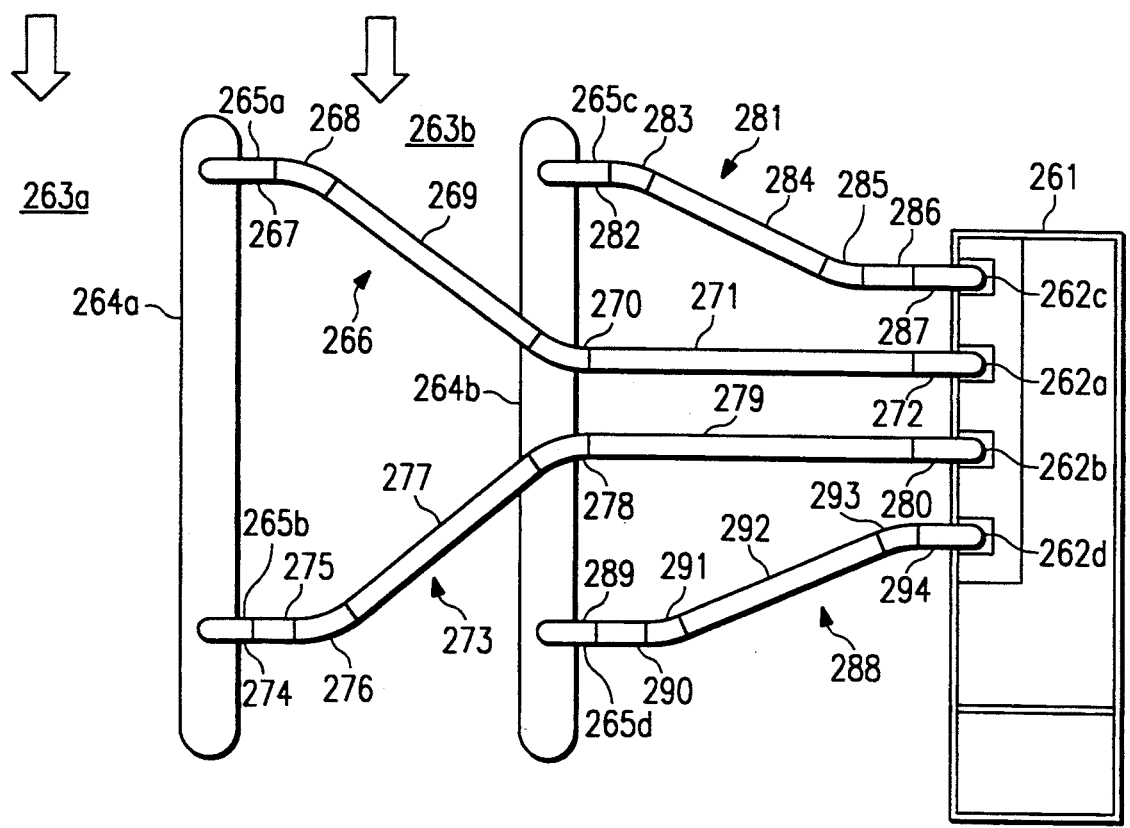
FIG. 25 is a plan view of a plurality of conveyor systems in accordance with the invention for a drive-in facility having a plurality of operator stations located in a building and an equal number of customer locations located remotely from the building wherein the drive-in lanes are generally parallel to the building and the number of customer locations is greater than the number of drive-in lanes.

Referring now to FIG. 25, a drive-in facility has a building 261 containing four operator stations 262a–262d located along one side of the building facing two drive-through lanes 263a–263b which are defined by raised islands 264a–264b and which are generally parallel to the side of the building 261 containing the operator stations 262a–262d. Island 264a is provided with two customer stations 265a, 265b, while island 264b is also provided with two customer stations 265c, 265d. Thus, while each of the customer stations 265a–265d can be viewed by the operator at the corresponding operator station 262a–262d, the customer stations 265a–265d are located remotely from the operator stations 262a–262d. Thus, it is desirable that a conveyor system be provided between each customer station 265a–265d and its corresponding operator station 262a–262d.

In accordance with the present invention, a conveyor system 266 comprises a vertical segment (not shown) at the customer station 265a, a vertical-to-horizontal transition segment 267, a horizontal right-turn segment 268, a straight horizontal segment 269, a horizontal left-turn segment 270, a straight horizontal segment 271, a horizontal-to-vertical transition segment 272, and a vertical segment (not shown) at the operator station 262a. The conveyor system 273 comprises a vertical segment (not shown) at the customer station 265b, a vertical-to-horizontal transition segment 274, a straight horizontal segment 275, a horizontal left-turn segment 276, a straight horizontal segment 277, a horizontal right-turn segment 278, a straight horizontal segment 279, a horizontal-to-vertical transition segment 280, and a vertical segment (not shown) at the operator station 262b. The conveyor system 281 comprises a vertical segment (not shown) at the customer station 265c, a vertical-to-horizontal transition segment 282, a horizontal right-turn segment 283, a straight horizontal segment 284, a horizontal left-turn segment 285, a straight horizontal segment 286, a horizontal-to-vertical transition segment 287, and a vertical segment (not shown) at the operator station 262c. The conveyor system 288 comprises a vertical segment (not shown) at the customer station 265d, a vertical-to-horizontal transition segment 289, a horizontal straight segment 290, a horizontal left-turn segment 291, a straight horizontal segment 292, a horizontal right-turn segment 293, a horizontal-to-vertical transition segment 294, and a vertical segment (not shown) at the operator station 262d. Such conveyor systems can be located above ground or intermediate segments of the conveyor system can be located underground.

Obviously, the designations of "right-turn" and "left-turn" transitions utilized in the foregoing description are in terms of moving from the customer stations toward the operator stations, as these transitions would have the opposite designations for the return trip from the operator stations to the customer stations. Similarly, a horizontal-to-vertical transition for movement of the carriage in one direction is also a vertical-to-horizontal transition for the movement of the carriage in the opposite direction.

The tape conveyor has the advantages of being, in general, quieter than a chain conveyor or a cable conveyor, and does not have to be lubricated, which is particularly advantageous for food service installations. As illustrated, the tape conveyor can be utilized to provide a non-planar path.

Reasonable variations and modifications are possible within the scope of the foregoing description, the drawings and the appended claims to the invention. For example, with appropriate positioning of the drive-through lanes and the operator stations, the conveyor systems 16f, 16e, and 16d can be the mirror images of the conveyor systems 16a, 16b, and 16c of FIG. 1, similar to the systems illustrated in FIG. 25. The conveyor systems can also transition from the vertical segments to horizontal segments which are located at different elevations so that the intermediate segments 24a–24f can be located above each other in a single common structure which is perpendicular to the side of building 11 where the operator stations 12a–12f are located, thus permitting each of the conveyor systems to be formed from standardized 90° horizontal-to-horizontal curved segments and standardized 90° vertical-to-horizontal curved segments in addition to horizontal and vertical segments of appropriate lengths.

The segments are not limited to the horizontal and vertical orientations, but can include segments, either straight or curved, which are inclined at an acute angle to the vertical. Thus the term "vertical-to-horizontal" is used to refer to a curve located in an at least generally vertical plane where the curve provides for a change in the inclination of the carriage track to the horizontal, either upwardly or downwardly, without requiring either that the initial direction have either a 0° or a 90° orientation to the horizontal or that the final direction have either a 0° or a 90° orientation to the horizontal. Similarly, the term "horizontal-to-horizontal" is used to refer to a curve located in an at least generally horizontal plane where the curve provides for a change in the inclination of the carriage track to magnetic north, with the change being either an increase or a decrease in the inclination, without requiring either that the initial direction have a particular orientation to magnetic north or that the final direction have a particular orientation to the magnetic north.

A portion or the entirety of each conveyor system can be employed without the enclosing housing 51, thereby facilitating access to the transport container 55. Flexible curtain members can be mounted on or adjacent to face plates 74 and 75 so as to close the gap between the face plates 74 and 75 in the absence of the carriage 53 while flexing to permit the passage of the axle 62 as the carriage 53 moves along the carriage track 52, thereby protecting the interior of the carriage guide 52 from air borne debris.

We claim:

1. A tape drive system comprising a flexible plastic drive tape and a drive mechanism for driving said flexible plastic drive tape, said flexible plastic drive tape having a plurality of apertures spaced apart along the longitudinal axis of the flexible plastic drive tape, said drive mechanism comprising:

first and second idler rolls, each of said first and second idler rolls having an at least substantially cylindrical periphery, said first idler roll being rotatably mounted on a first shaft, said second idler roll being rotatably mounted on a second shaft; and a cog wheel having an at least substantially cylindrical periphery, said cog wheel being rotatably mounted on a third shaft;

said cog wheel being positioned adjacent to and between said first and second idler rolls such that the flexible plastic drive tape passes in contact with the at least substantially cylindrical periphery of one of said first and second idler rolls, then passes in contact with the at least substantially cylindrical periphery of said cog wheel, and then passes in contact with the at least substantially cylindrical periphery of the other of said first and second idler rolls without forming a significant straight section between said cog wheel and said other of said first and second idler rolls;

said cog wheel being provided with a plurality of teeth spaced about its at least substantial cylindrical periphery so that teeth of the cog wheel enter apertures of the flexible plastic drive tape as the flexible plastic drive tape passes in contact with the cog wheel and the resulting curved path of the flexible plastic drive tape around a portion of said cog wheel creates compression of the flexible plastic drive tape along its inner surface and stretching of the flexible plastic drive tape along its outer surface.

2. A tape drive system in accordance with claim 1, wherein the at least substantial cylindrical periphery of each of said idler rolls is at least substantially smooth so that the only mechanical engagement between the drive mechanism and the flexible plastic drive tape is by the teeth on the cog wheel.

3. A tape drive system in accordance with claim 1, wherein said first, second and third shafts are at least substantially parallel to each other; and wherein each of said idler rolls has a diameter which is between about 50 and about 100 percent of the diameter of said cog wheel.

4. A tape drive system in accordance with claim 1, wherein the flexible plastic drive tape passes around at least about 60° of the at least substantially cylindrical periphery of each of the idler rolls while passing around at least about 120° of the at least substantially cylindrical periphery of the cog wheel.

5. A tape drive system in accordance with claim 4, wherein the flexible plastic drive tape passes around less than about 150° of the at least substantially cylindrical periphery of each of the idler rolls, while passing around less than about 300° of the at least substantially cylindrical periphery of the cog wheel.

6. A tape drive system in accordance with claim 1, wherein the cog wheel and the first and second idler rolls are positioned so that the flexible plastic drive tape is tangent to the first idler roll and to the cog wheel at a first common point, and is also tangent to the second idler roll and to the cog wheel at a second common point.

7. A tape drive system in accordance with claim 1, wherein the cog wheel and the first and second idler rolls are positioned so that the flexible plastic drive tape leaves the first idler roll and contacts the cog wheel without any substantial length of straight path therebetween, and then leaves the cog wheel and contacts the second idler roll without a substantial length of straight path therebetween.

8. A tape drive system in accordance with claim 7:

wherein said first, second and third shafts are at least substantially parallel to each other;

wherein the at least substantial cylindrical periphery of each of said idler rolls is at least substantially smooth so that the only mechanical engagement between the drive mechanism and the flexible plastic drive tape is by the teeth on the cog wheel;

wherein each of said idler rolls has a diameter which is between about 50 and about 100 percent of the diameter of said cog wheel;

wherein the flexible plastic drive tape passes around at least about 60° and less than about 150° of the at least substantially cylindrical periphery of each of the idler rolls while passing around at least about 120° and less than about 300° of the at least substantially cylindrical periphery of the cog wheel; and wherein the cog wheel and the first and second idler rolls are positioned so that the flexible plastic drive tape is tangent to the first idler roll and to the cog wheel at a first common point, and is also tangent to the second idler roll and to the cog wheel at a second common point.

9. A tape conveyor system for moving a carriage along a path in response to the movement of a drive tape, said system comprising:

a carriage track having first and second carriage channels, each of said first and second carriage channels having confronting side walls joined by an end wall to form a channel opening, said first and second carriage channels being spaced apart from each other with the channel openings facing each other;

a tape guide for orienting the width of the drive tape and guiding the drive tape during movement of the drive tape along the longitudinal axis of the drive tape, said tape guide being positioned adjacent to and extending along said carriage track; and a carriage positioned in said carriage track, said carriage having a body, at least one first wheel positioned in said first carriage channel, and at least one second wheel positioned in said second carriage channel, at least one third wheel positioned in said first carriage channel, at least one fourth wheel positioned in said second carriage channel, each said at least one first wheel being rotatably mounted on said body for rotation about an axis which provides for rotation of each first wheel along and in contact with at least one of the side walls of said first carriage channel, each said at least one second wheel being rotatably mounted on said body for rotation about an axis which provides for rotation of each second wheel along and in contact with at least one of the side walls of said second carriage channel, each said at least one third wheel being rotatably mounted on said body for rotation about an axis which provides for rotation of each third wheel along the end wall of said first carriage channel, each said at least one fourth wheel being rotatably mounted on said body for rotation about an axis which provides for rotation of each fourth wheel along the end wall of said second carriage channel;

said carriage having at least one carriage drive element which is engaged by the drive tape during movement of the drive tape along said tape guide.

10. A tape conveyor system in accordance with claim 9, wherein there are at least two first wheels, at least two second wheels, at least two third wheels, and at least two fourth wheels.

11. A tape conveyor system in accordance with claim 10, further comprising a transport container supported by said carriage.

12. A tape conveyor system in accordance with claim 11, further comprising a leveling mechanism mounting said transport container to said carriage.

13. A tape conveyor system in accordance with claim 12, further comprising at least one cam guide surface positioned to extend along at least a portion of said carriage track, wherein said leveling mechanism has at least one cam follower which can engage said at least one cam guide surface as the carriage moves along said carriage track so that the orientation of said transport container is controlled by said leveling mechanism in response to the movement of said at least one cam follower.

14. A tape conveyor system in accordance with claim 13, wherein said leveling mechanism comprises:
an axle secured to said carriage;
a leveler case secured to said axle;
a leveler shaft rotatably mounted in said leveler case;
a leveler arm having an intermediate section and first and second end sections extending outwardly from said intermediate section, said intermediate section of said leveler arm being secured to said leveler shaft, a first cam follower mounted on said first end section and a second cam follower mounted on said second end section so that at least one of said first and second cam followers engages said at least one cam guide surface;
a leveler arm gear secured to said leveler shaft for rotation therewith;
a hub secured to said transport container and mounted on said axle for rotation relative to said axle;
a hub gear secured to said hub for rotation therewith, said hub gear being driven by said leveler arm gear.

15. A tape conveyor system in accordance with claim 13, wherein said carriage track comprises at least one first track section forming a vertical-to-horizontal transition curve.

16. A tape conveyor system in accordance with claim 15, wherein said carriage track comprises at least one second track section forming a horizontal-to-horizontal transition curve.

17. A tape conveyor system in accordance with claim 16, wherein said tape guide orients the width of the drive tape in an at least generally horizontal direction during each vertical-to-horizontal transition curve and orients the width of the drive tape in an at least generally vertical direction during each horizontal-to-horizontal transition curve.

18. A tape conveyor System in accordance with claim 17, wherein said leveling mechanism comprises:
an axle secured to said carriage;
a leveler case secured to said axle;
a leveler shaft rotatably mounted in said leveler case;
a leveler arm having an intermediate section and first and second end sections extending outwardly from said intermediate section, said intermediate section of said leveler arm being secured to said leveler shaft, a first cam follower mounted on said first end section and a second cam follower mounted on said second end section so that at least one of said first and second cam followers engages said at least one cam guide surface;
a leveler arm gear secured to said leveler shaft for rotation therewith;
a hub secured to said transport container and mounted on said axle for rotation relative to said axle;
a hub gear secured to said hub for rotation therewith, said hub gear being driven by said leveler arm gear.

19. A tape conveyor system in accordance with claim 18, wherein said carriage track further comprises at least one third track section which extends at least substantially horizontally, each said third track section having one of said cam guide surfaces extending along the length of the respective third track section such that each of the first and second cam followers ride on the one of said cam guide surfaces on each third track section, thereby preventing any rocking motion of said transport container as the carriage moves along each said third track section.

20. A tape conveyor system in accordance with claim 18, wherein each first track section has one of said cam guide surfaces extending along the length of the respective first track section such that one of said first and second cam guide followers engages the one of said cam guide surfaces on each first track section to thereby drive said leveling mechanism to maintain the desired orientation of the transport container.

21. A tape conveyor system in accordance with claim 20, wherein said carriage track further comprises at least one third track section which extends at least substantially horizontally, each said third track section having one of said cam guide surfaces extending along the length of the respective third track section such that each of the first and second cam followers ride on the one of said cam guide surfaces on each third track section, thereby preventing any rocking motion of said transport container as the carriage moves along each said third track section.

22. A tape conveyor system in accordance with claim 21, wherein each second track section has one of said cam guide surfaces extending along the length of the respective second track section such that each of the first and second cam followers ride on the one of said cam guide surfaces on each second track section, thereby preventing any rocking motion of said transport container as the carriage moves along each said second track section.

23. A tape conveyor system in accordance with claim 17, wherein said at least one cam guide surface and said leveling mechanism cooperate to maintain said transport container in a vertical orientation throughout the movement of said carriage along said carriage track.

24. A tape conveyor system in accordance with claim 23, wherein there are at least two carriage drive elements mounted on said carriage, and wherein said tape conveyor system further comprises a drive tape positioned in said tape guide and a tape drive block secured to said drive tape and movably positioned between two of said carriage drive elements so as to engage one of said two carriage drive elements during movement of the drive tape in a first longitudinal direction along said tape guide and to engage the other of said two carriage drive elements during movement of the drive tape in a second longitudinal direction which is opposite to said first longitudinal direction, without any direct attachment between said tape drive block and said two carriage drive elements.

25. A tape conveyor system in accordance with claim 24, wherein said tape drive block is rotatably positioned between said two carriage drive elements for relative rotational movement between said tape drive block and said two carriage drive elements so that said tape drive block engages one of the two carriage drive elements when the width of the drive tape is oriented in a generally horizontal direction during each vertical-to-horizontal transition curve as well as when the width of the drive tape is oriented in a generally vertical direction during each horizontal-to-horizontal transition curve.

26. A tape conveyor system in accordance with claim 25, wherein said drive tape has a plurality of apertures spaced apart along the longitudinal axis of the drive tape; said tape conveyor system further comprising:

first and second idler rolls, each of said first and second idler rolls having an at least substantially cylindrical periphery, said first idler roll being rotatably mounted on a first shaft, said second idler roll being rotatably mounted on a second shaft; and a cog wheel having an at least substantially cylindrical periphery, said cog wheel being rotatably mounted on a third shaft;

said cog wheel being positioned adjacent to and between said first and second idler rolls such that said drive tape passes in contact with the at least substantially cylindrical periphery of one of said first and second idler rolls, then passes in contact with the at least substantially cylindrical periphery of said cog wheel, and then passes in contact with the at least substantially cylindrical periphery of the other of said first and second idler rolls without forming a significant straight section between said cog wheel and said other of said first and second idler rolls;

said cog wheel being provided with a plurality of teeth spaced about its at least substantial cylindrical periphery so that teeth of the cog wheel enter apertures of the drive tape as the drive tape passes in contact with the cog wheel.

27. A tape conveyor system in accordance with claim 26, wherein the cog wheel and the first and second idler rolls constitute a drive mechanism;

wherein said first, second and third shafts are at least substantially parallel to each other;

wherein the at least substantial cylindrical periphery of each of said idler rolls is at least substantially smooth so that the only mechanical engagement between the drive mechanism and the drive tape is by the teeth on the cog wheel;

wherein each of said idler rolls has a diameter which is between about 50 and about 100 percent of the diameter of said cog wheel;

wherein the drive tape passes around at least about 60° and less than about 150° of the at least substantially cylindrical periphery of each of the idler rolls while passing around at least about 120° and less than about 300° of the at least substantially cylindrical periphery of the cog wheel; and wherein the cog wheel and the first and second idler rolls are positioned so that the drive tape is tangent to the first idler roll and to the cog wheel at a first common point, and is also tangent to the second idler roll and to the cog wheel at a second common point.

28. A tape conveyor system in accordance with claim 27, wherein said drive tape forms an endless loop, said tape conveyor system further comprising tensioning rolls mounted in contact with said drive tape so as to maintain a desired tension on said drive tape.

29. A tape conveyor system in accordance with claim 28, further comprising a toothed idler roll positioned at an intermediate location of said endless loop such that said toothed idler roll contacts two portions of said drive tape on opposite sides of said endless loop, said toothed idler roll having an at least substantially cylindrical periphery with teeth equally spaced about its at least substantially cylindrical periphery so that the teeth of said toothed idler roll enter apertures in each of said two portions of said drive tape.

30. A tape conveyor system in accordance with claim 9, wherein said carriage track comprises at least one first track section forming a vertical-to-horizontal transition curve.

31. A tape conveyor system in accordance with claim 30, wherein said carriage track comprises at least one second track section forming a horizontal-to-horizontal transition curve.

32. A tape conveyor system in accordance with claim 31, wherein said tape guide orients the width of the drive tape in an at least generally horizontal direction during each vertical-to-horizontal transition curve and orients the width of the drive tape in an at least generally vertical direction during each horizontal-to-horizontal transition curve.

33. A tape conveyor system in accordance with claim 32, wherein there are at least two carriage drive elements mounted on said carriage, and wherein said tape conveyor system further comprises a drive tape positioned in said tape guide and a tape drive block secured to said drive tape and movably positioned between two of said carriage drive elements so as to engage one of said two carriage drive elements during movement of the drive tape in a first longitudinal direction along said tape guide and to engage the other of said two carriage drive elements during movement of the drive tape in a second longitudinal direction which is opposite to said first longitudinal direction, without any direct attachment between said tape drive block and said two carriage drive elements.

34. A tape conveyor system in accordance with claim 33, wherein said tape drive block is rotatably positioned between said two carriage drive elements for relative rotational movement between said tape drive block and said two carriage drive elements so that said tape drive block engages one of the two carriage drive elements when the width of the drive tape is oriented in a generally horizontal direction during each vertical-to-horizontal transition curve as well as when the width of the drive tape is oriented in a generally vertical direction during each horizontal-to-horizontal transition curve.

35. A tape conveyor system in accordance with claim 9, wherein there are at least two carriage drive elements mounted on said carriage, and wherein said tape conveyor system further comprises a drive tape positioned in said tape guide and a tape drive block secured to said drive tape and movably positioned between two of said carriage drive elements so as to engage one of said two carriage drive elements during movement of the drive tape in a first longitudinal direction along said tape guide and to engage the other of said two carriage drive elements during movement of the drive tape in a second longitudinal direction which is opposite to said first longitudinal direction, without any direct attachment between said tape drive block and said two carriage drive elements.

36. A tape conveyor system in accordance with claim 9, wherein said drive tape has a plurality of apertures spaced apart along the longitudinal axis of the drive tape; said tape conveyor system further comprising:

first and second idler rolls, each of said first and second idler rolls having an at least substantially cylindrical periphery, said first idler roll being rotatably mounted on a first shaft, said second idler roll being rotatably mounted on a second shaft; and a cog wheel having an at least substantially cylindrical periphery, said cog wheel being rotatably mounted on a third shaft;

said cog wheel being positioned adjacent to and between said first and second idler rolls such that said drive tape passes in contact with the at least substantially cylindrical periphery of one of said first and second idler rolls, then passes in contact with the at least substantially cylindrical periphery of said cog wheel, and then passes in contact with the at least substantially cylindrical periphery of the other of said first and second idler rolls without forming a significant straight section between said cog wheel and said other of said first and second idler rolls;

said cog wheel being provided with a plurality of teeth spaced about its at least substantial cylindrical periphery so that teeth of the cog wheel enter apertures of the drive tape as the drive tape passes in contact with the cog wheel.

37. A tape conveyor system in accordance with claim 36, wherein the cog wheel and the first and second rolls constitute a drive mechanism;

wherein said first, second and third shafts are at least substantially parallel to each other;

wherein the at least substantial cylindrical periphery of each of said idler rolls is at least substantially smooth so that the only mechanical engagement between the drive mechanism and the drive tape is by the teeth on the cog wheel;

wherein each of said idler rolls has a diameter which is between about 50 and about 100 percent of the diameter of said cog wheel;

wherein the drive tape passes around at least about 60° and less than about 150° of the at least substantially cylindrical periphery of each of the idler rolls while passing around at least about 120° and less than about 300° of the at least substantially cylindrical periphery of the cog wheel; and wherein the cog wheel and the first and second idler rolls are positioned so that the drive tape is tangent to the first idler roll and to the cog wheel at a first common point, and is also tangent to the second idler roll and to the cog wheel at a second common point.

38. A tape conveyor system in accordance with claim 9, wherein the drive tape forms an endless loop, said tape conveyor system further comprising tensioning rolls mounted to provide contact with the drive tape so as to maintain a desired tension on the drive tape.

39. A tape conveyor system in accordance with claim 9, wherein said drive tape has a plurality of apertures spaced apart along the longitudinal axis of the drive tape; said tape conveyor system further comprising a toothed idler roll positioned such that said toothed idler roll contacts two different spaced apart portions of said drive tape, said toothed idler roll having an at least substantially cylindrical periphery with teeth equally spaced about its at least substantially cylindrical periphery so that the teeth of said toothed idler roll enter apertures in each of said two portions of said drive tape.

40. A tape conveyor system for moving a carriage along a path in response to the movement of a drive tape, said drive tape having a width and a longitudinal axis, said system comprising:

a carriage track having a length;

a tape guide for orienting the width of the drive tape and guiding the drive tape during movement of the drive tape along the longitudinal axis of the drive tape, said tape guide being positioned adjacent to and extending along the length of said carriage track; and a carriage movably positioned in said carriage track for movement along the length of said carriage track, said carriage having at least one carriage drive element which is engaged by the drive tape during movement of the drive tape along said tape guide;

wherein said carriage track comprises at least one first track section forming a vertical-to-horizontal transition curve and at least one second track section forming a horizontal-to-horizontal transition curve;

wherein said tape guide orients the width of the drive tape in an at least generally horizontal direction during each vertical-to-horizontal transition curve and orients the width of the drive tape in an at least generally vertical direction during each horizontal-to-horizontal transition curve.

41. A tape conveyor system in accordance with claim 40, further comprising a transport container supported by said carriage.

42. A tape conveyor system in accordance with claim 41, further comprising a leveling mechanism mounting said transport container to said carriage.

43. A tape conveyor system in accordance with claim 42, further comprising at least one cam guide surface positioned to extend along at least a portion of said carriage track, wherein said leveling mechanism has at least one cam follower which can engage said at least one cam guide surface as the carriage moves along said carriage track so that the orientation of said transport container is controlled by said leveling mechanism in response to the movement of said at least one cam follower.

44. A tape conveyor system in accordance with claim 43, wherein said leveling mechanism comprises:

an axle secured to said carriage;

a leveler case secured to said axle;

a leveler shaft rotatably mounted in said leveler case;

a leveler arm having an intermediate section and first and second end sections extending outwardly from said intermediate section, said intermediate section of said leveler arm being secured to said leveler shaft, a first cam follower mounted on said first end section and a second cam follower mounted on said second end section so that at least one of said first and second cam followers engages said at least one cam guide surface;

a leveler arm gear secured to said leveler shaft for rotation therewith;

a hub secured to said transport container and mounted on said axle for rotation relative to said axle;

a hub gear secured to said hub for rotation therewith, said hub gear being driven by said leveler arm gear.

45. A tape conveyor system in accordance with claim 44, wherein said carriage track further comprises at least one third track section which extends at least substantially horizontally, each said third track section having one of said cam guide surfaces extending along the length of the respective third track section such that each of the first and second cam followers ride on the one of said cam guide surfaces on each third track section, thereby preventing any rocking motion of said transport container as the carriage moves along each said third track section.

46. A tape conveyor system in accordance with claim 45, wherein each first track section has one of said cam guide surfaces extending along the length of the respective first track section such that one of said first and second cam guide followers engages the one of said cam guide surfaces on each first track section to thereby drive said leveling mechanism to maintain the desired orientation of the transport container.

47. A tape conveyor system in accordance with claim 46, wherein each second track section has one of said cam guide surfaces extending along the length of the respective second track section such that each of the first and second cam followers ride on the one of said cam guide surfaces on each second track section, thereby preventing any rocking motion of said transport container as the carriage moves along each said second track section.

48. A tape conveyor system in accordance with claim 40, wherein there are at least two carriage drive elements mounted on said carriage, and wherein said tape conveyor system further comprises a drive tape positioned in said tape guide and a tape drive block secured to said drive tape and movably positioned between two of said carriage drive elements so as to engage one of said two carriage drive elements during movement of the drive tape in a first longitudinal direction along said tape guide and to engage the other of said two carriage drive elements during movement of the drive tape in a second longitudinal direction which is opposite to said first longitudinal direction, without any direct attachment between said tape drive block and said two carriage drive elements.

49. A tape conveyor system in accordance with claim 48, wherein said tape drive block is rotatably positioned between said two carriage drive elements for relative rotational movement between said tape drive block and said two carriage drive elements so that said tape drive block engages one of the two carriage drive elements when the width of the drive tape is oriented in a generally horizontal direction during each vertical-to-horizontal transition curve as well as when the width of the drive tape is oriented in a generally vertical direction during each horizontal-to-horizontal transition curve.

50. A tape conveyor system in accordance with claim 40, wherein said drive tape has a plurality of apertures spaced apart along the longitudinal axis of the drive tape; said tape conveyor system further comprising:

first and second idler rolls, each of said first and second idler rolls having an at least substantially cylindrical periphery, said first idler roll being rotatably mounted on a first shaft, said second idler roll being rotatably mounted on a second shaft; and a cog wheel having an at least substantially cylindrical periphery, said cog wheel being rotatably mounted on a third shaft;

said cog wheel being positioned adjacent to and between said first and second idler rolls such that said drive tape passes in contact with the at least substantially cylindrical periphery of one of said first and second idler rolls, then passes in contact with the at least substantially cylindrical periphery of said cog wheel, and then passes in contact with the at least substantially cylindrical periphery of the other of said first and second idler rolls without forming a significant straight section between said cog wheel and said other of said first and second idler rolls;

said cog wheel being provided with a plurality of teeth spaced about its at least substantial cylindrical periphery so that teeth of the cog wheel enter apertures of the drive tape as the drive tape passes in contact with the cog wheel.

51. A tape conveyor system in accordance with claim 50, wherein the cog wheel and the first and second idler rolls constitute a drive mechanism;

wherein said first, second and third shafts are at least substantially parallel to each other;

wherein the at least substantial cylindrical periphery of each of said idler rolls is at least substantially smooth so that the only mechanical engagement between the drive mechanism and the drive tape is by the teeth on the cog wheel;

wherein each of said idler rolls has a diameter which is between about 50 and about 100 percent of the diameter of said cog wheel;

wherein the drive tape passes around at least about 60° and less than about 150° of the at least substantially cylindrical periphery of each of the idler rolls while passing around at least about 120° and less than about 300° of the at least substantially cylindrical periphery of the cog wheel; and wherein the cog wheel and the first and second idler rolls are positioned so that the drive tape is tangent to the first idler roll and to the cog wheel at a first common point, and is also tangent to the second idler roll and to the cog wheel at a second common point.

52. A tape conveyor system in accordance with claim 40, wherein the drive tape forms an endless loop, said tape conveyor system further comprising tensioning rolls mounted to provide contact with the drive tape so as to maintain a desired tension on the drive tape.

53. A tape conveyor system in accordance with claim 40, wherein said drive tape has a plurality of apertures spaced apart along the longitudinal axis of the drive tape; said tape conveyor system further comprising a toothed idler roll positioned such that said toothed idler roll contacts two different spaced apart portions of said drive tape, said toothed idler roll having an at least substantially cylindrical periphery with teeth equally spaced about its at least substantially cylindrical periphery so that the teeth of said toothed idler roll enter apertures in each of said two portions of said drive tape.

* * * * *